United States Patent
Otsuka et al.

(10) Patent No.: US 8,237,971 B2
(45) Date of Patent: Aug. 7, 2012

(54) PRINTER SYSTEM, PRINTER, AND IMAGE REGISTRATION METHOD

(75) Inventors: Junichi Otsuka, Chikuma (JP); Toshiyuki Sugimoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/012,355

(22) Filed: Jan. 24, 2011

(65) Prior Publication Data

US 2011/0122443 A1    May 26, 2011

Related U.S. Application Data

(62) Division of application No. 11/404,726, filed on Apr. 14, 2006, now Pat. No. 7,884,958.

(30) Foreign Application Priority Data

Apr. 15, 2005 (JP) .................................. 2005-118964
Jun. 14, 2005 (JP) .................................. 2005-174358

(51) Int. Cl.
  *G06F 15/00* (2006.01)
  *G06K 5/04* (2006.01)
(52) U.S. Cl. ........................................ 358/1.15; 714/20
(58) Field of Classification Search .................. 358/1.15, 358/1.13, 1.14, 1.16, 1.18, 3.28, 1.9, 1.1, 358/474, 498, 401; 709/200, 203, 217, 223, 709/230, 232; 715/202, 203, 209; 382/115, 382/100; 400/61, 62, 76, 109, 110; 365/189.5
See application file for complete search history.

(56) References Cited

U.S. PATENT DOCUMENTS

| | | | |
|---|---|---|---|
| 5,557,707 A | 9/1996 | Inoue et al. | |
| 6,847,377 B2 | 1/2005 | Kitahara et al. | |
| 7,085,006 B2 | 8/2006 | Yokoyama et al. | |
| 7,280,258 B2 | 10/2007 | Kitahara et al. | |
| 7,292,369 B2 | 11/2007 | Yokoyama et al. | |
| 2002/0101615 A1 | 8/2002 | Kitahara et al. | |
| 2003/0002060 A1* | 1/2003 | Yokoyama et al. | 358/1.9 |
| 2006/0062053 A1* | 3/2006 | Taniguchi et al. | 365/189.05 |
| 2008/0013112 A1 | 1/2008 | Yokoyama et al. | |

FOREIGN PATENT DOCUMENTS

| | | | |
|---|---|---|---|
| JP | 02277667 A | 11/1990 |
| JP | 05053740 A | 3/1993 |
| JP | 2002112057 A | 4/2002 |
| JP | 2002269550 A | 9/2002 |
| JP | 2002287940 A | 10/2002 |
| JP | 2003175645 A | 6/2003 |
| JP | 2004058499 A | 2/2004 |
| JP | 2004142172 A | 5/2004 |
| JP | 2004348414 A | 12/2004 |

* cited by examiner

*Primary Examiner* — Saeid Ebrahimi Dehkordy
(74) *Attorney, Agent, or Firm* — Nutter McClennen & Fish LLP; John J. Penny, V; Christopher J. Stow

(57) ABSTRACT

A printer, image registration method, and printer system improve image data processing efficiency by tracking and storing the identical image data that is registered and stored in a printer. The image registration device has a graphics register for registering images in a printer. The graphics register sends the image data to be registered to the printer, receives an identification number from the printer, and records and stores a registered image data information file linking the image data sent to the printer with the printer identification number.

4 Claims, 23 Drawing Sheets

<Parameters>

| Logo | Settings |
|---|---|
| top logo | ID, alignment, number of lines to delete |
| bottom logo | ID, alignment |
| watermark | ID, top margin, printing interval, alignment |
| keyword logo | ID, text string, alignment, number of lines to delete, printing position |

<Top logo>

| ID | alignment | number of lines to delete |
|---|---|---|
| 2020 | center | 3 |

<Bottom logo>

| ID | alignment |
|---|---|
| 2021 | center |

<Watermark>

| ID | top margin | printing interval | alignment |
|---|---|---|---|
| 2022 | 40dot | 20dot | center |

<Keyword logo>

| ID | text string | alignment | number of lines to delete | printing position |
|---|---|---|---|---|
| 2025 | strawberry | center | 0 | line following the text printing line |

FIG. 3

PRINTER SYSTEM, PRINTER, AND IMAGE REGISTRATION METHOD

The present application is a Divisional of U.S. application Ser. No. 11/404,726, filed on Apr. 14, 2006 now U.S. Pat. No. 7,884,958, the contents of which are incorporated herein by reference, and claims priority to U.S. application Ser. No. 11/404,726 under 35 U.S.C. §120. Priority under 35 U.S.C. §119 is claimed to Japanese Patent Application 2005-118964 filed on Apr. 15, 2005 and Japanese Patent Application 2005-174358 filed on Jul. 14, 2005, which are hereby incorporated by reference in their entirety.

BACKGROUND OF THE INVENTION

1. Field of the Invention

The present invention relates to a printer in which images can be registered and stored, to an image registration device for registering images in the printer, to an efficient printer system composed of this printer and image registration device, and to an image registration method.

2. Description of Related Art

Some printers that are used in POS systems enable the user to store image data in the printer. Such printers typically have internal nonvolatile storage such as NVRAM in which image data representing the store logo, coupons, or other information is stored. The printer then prints the image data on roll paper, for example, based on commands from the host computer to issue a sales receipt. Compared with a text-only receipt, this enables the store to print more attractive receipts, creating a more favorable impression on the customer.

This system also eliminates the need for the host computer to send the image data to the printer each time a receipt is printed because the image data resides in the printer. Image data can thus be printed frequently even when the communication rate between the host and printer is slow and the system is thus not well-suited to transferring large images.

A key code or identification (ID) code that uniquely identifies each image is assigned to each image data file stored in the printer. The image data is managed in the printer using the key code assigned to each image. When the printer receives a key code or a print command associated with a particular key code from the host computer at a predetermined timing, the printer prints to roll paper the image data corresponding to the received key code or the image associated with the predefined command. The host computer can thus simply send the appropriate key code or print command associated with a particular key code to cause the printer to print a particular image.

A problem with this conventional arrangement is that it is difficult for the user to know what image corresponds to a particular key code. In order for the user to edit image data stored in the printer, he or she must enter a key code and print a hard copy preview of the corresponding image, or print a test page of key codes and corresponding images in order to select and edit the desired image.

Furthermore, in order to preview the images on the display of the host computer, the image data must be acquired from the printer.

If the printer is connected through a serial interface or other similarly slow interface, time will be wasted waiting for the image data to travel between the printer and host computer, thus reducing data processing efficiency.

To solve these problems, an object of the present invention is to provide a printer in which images can be stored while enabling the user to efficiently process the stored image data using an image registration device, an efficient printer system comprising these devices, and an image registration method for registering images in the printer.

SUMMARY OF THE INVENTION

To achieve this object, a printer system according to a first embodiment of the invention is a printer system comprising an image registration device capable of communicating with a printer, wherein: the image registration device sends image data and an image data registration command to the printer; the printer includes a data communication unit for receiving commands and image data sent from the image registration device, and an image registration unit for registering the received image data in a designated storage area; the data communication unit sends a printer identification number to the image registration device when image data is registered; and the image registration device records the image data and the received printer serial number in a registration log file.

A printer system according to a second embodiment of the invention is the printer system according to the first embodiment of the invention wherein the image registration device generates a key code identifying the image data, sends the key code paired with the image data to the printer, and records the path describing the storage location of the source file of the image data linked to the key code in the registration log file.

A printer system according to a third embodiment of the invention is the printer system according to the second embodiment of the invention wherein the image registration device applies an image conversion process to the source image file to generate and send the image data to the printer, and records the path describing the storage location of the source image file linked to the parameters of the applied image conversion process in the registration log file.

A printer system according to a fourth embodiment of the invention is the printer system according to the third embodiment of the invention wherein the image registration device sends a delete command denoting the image data to be deleted to the printer in order to delete image data from the printer; the image registration unit of the printer deletes the image data specified in the delete command and returns the printer identification number to the image registration device; and the image registration device accesses the registration log file corresponding to the printer identification number, deleting the record of the image data corresponding to the image data deleted in the printer.

A printer system according to a fifth embodiment of the invention is the printer system according to any of the first to fourth embodiments of the invention wherein the image registration device accesses the registration log file to present a preview of the corresponding image data registered in the printer.

A printer system according to a sixth embodiment of the invention is the printer system according to any of the first to fifth embodiments of the invention wherein the printer additionally includes an identification number overwriting unit for generating a new printer identification number and overwriting the existing printer identification number each time a process is run by the image registration unit; the communication unit of the printer sends the new printer identification number to the image registration device after processing by the image registration unit ends; and the image registration device records the new printer identification number linked to the transmitted image data in the registration log file.

A printer system according to a seventh embodiment of the invention is the printer system according to the sixth embodiment of the invention wherein the image registration device receives the printer identification number from the printer before sending image data, and if there is a registration log file that matches the received printer identification number, receives a new printer identification number from the printer after sending the image data to the printer, and associates that image data to the new printer identification number in the registration log file.

A printer system according to an eighth embodiment of the invention is the printer system according to the sixth embodiment of the invention wherein the image registration device receives the printer identification number from the printer before sending image data, and if there is no registration log file associated with the received printer identification number, receives a new printer identification number from the printer after sending the image data to the printer, and generates a registration log file associating the new printer identification number with the sent image data.

A printer system according to a ninth embodiment of the invention is the printer system according to the sixth embodiment of the invention wherein the image registration device receives the printer identification number from the printer before sending a delete command for image data registered in the printer, and deletes the image data information from the registration log file after sending the delete command to the printer if there is a registration log file associated with the received printer identification number.

A printer system according to a tenth embodiment of the invention is the printer system according to the sixth embodiment of the invention wherein the image registration device receives the printer identification number from the printer before displaying image data registered in the printer, and displays the image data without acquiring the image data from the printer if there is a registration log file associated with the received printer identification number.

A printer system according to an eleventh embodiment of the invention is the printer system according to the sixth embodiment of the invention wherein for linked image data in the registration log file, the image registration device accesses the registration log file and displays the image data without acquiring image data from the printer.

A twelfth embodiment of the invention is a printer enabled to communicate with an image registration device, the printer comprising: a data communication unit for receiving image data sent from the image registration device; and an image registration unit for registering the received image data in a designated storage area; wherein the data communication unit sends to the image registration device a printer identification number enabling the image registration device to link the image data with that of the printer to which the image data was sent.

A printer according to a thirteenth embodiment of the invention is a printer according to the twelfth embodiment of the invention further comprising an identification number rewriting unit for overwriting the printer identification number with a new printer identification number each time a process is executed by the image registration unit; wherein the data communication unit sends the new printer identification number to the image registration device each time the identification number rewriting unit overwrites the printer identification number.

A printer according to a fourteenth embodiment of the invention is a printer according to the thirteenth embodiment of the invention wherein the printer identification number is composed of the serial number of the printer and a predetermined character string; and the identification number rewriting unit rewrites the printer identification number by overwriting the predetermined character string.

A fifteenth embodiment of the invention is an image registration method comprising steps of: sending image data to be registered to a printer; receiving from the printer a printer identification number; and recording the transmitted image data and the received printer identification number in a registration log file.

An image registration method according to a sixteenth embodiment of the invention is the image registration method according to the fifteenth embodiment of the invention further comprising steps of: generating a key code identifying image data; and additionally registering the path describing the storage location of the source image file of the image data linked to the key code in the registration log file.

An image registration method according to a seventeenth embodiment of the invention is the image registration method according to the sixteenth embodiment of the invention further comprising steps of generating the image data to be registered by applying an image conversion process to the source image file; and additionally recording the path describing the storage location of the source image file linked to the parameters of the applied image conversion process in the registration log file.

An image registration method according to an eighteenth embodiment of the invention is the image registration method according to the seventeenth embodiment of the invention further comprising steps of sending a delete command denoting image data to be deleted to the printer; receiving a printer identification number from the printer; and identifying a registration log file associated with the printer identification number and deleting the record of the image data in the registration log file corresponding to the deleted image data in the printer.

An image registration method according to a nineteenth embodiment of the invention is the image registration method according to any of the fifteenth to eighteenth embodiments of the invention further comprising a step of accessing the registration log file to present a preview of image data registered in the printer.

An image registration method according to a twentieth embodiment of the invention is the image registration method according to the nineteenth embodiment of the invention wherein the printer identification number is received from the printer to identify the registration log file to be accessed when presenting a preview.

When the image registration device sends image data to be registered to the printer, the image registration device also receives a printer identification number (printer ID number) from the printer, and records the transmitted image data with the printer ID number in a registration log file. The image registration device can therefore reliably store and retrieve the same image data that was sent to each printer. The user can thus know what images are stored in which printers without having to print a test image or proof sheet of thumbnail images from each printer.

The image registration device can also apply an image conversion process to the original image file to generate or modify image data sent to the printer, and can store a path describing where the original image file is stored, together with the parameters of the image conversion process in the registration log file. The image registration device can therefore apply the same image conversion process based on the stored parameters to the image file stored in the image registration device and thus present an image data preview without acquiring the image data from the printer. The present invention thus also enables the rapid presentation of an image preview even if the printer and image registration device are communicating through a slow data communication channel.

In order to delete image data from the printer, the image registration device can simply send a delete command declaring what image data to delete to the printer and receive the printer ID number from the printer. The image registration device can then use the printer ID number to identify the appropriate registration log file and delete the corresponding record for the deleted image data from the registration log. The registration log file maintained in the image registration device is thus always kept up to date so that the registration log always records what image data is actually stored in the printer, and the image registration device thus always stores the same image data that is stored in the printer without actually querying the printer or acquiring the image data from the printer.

The image registration device can also read the registration log file to present a preview of the image data stored in a particular printer. As a result, the user can preview the image data stored in a particular printer without the image registration device actually acquiring the image data from the printer.

Yet further, the image registration device receives a printer ID number from each printer and uses the printer ID number to identify the registration log file to be read. As a result, the image registration device can appropriately present a preview of images stored in a particular printer even when the image registration device stores image data corresponding to images stored in a plurality of printers.

Yet further, in response to a command from the image registration device, the printer ID number inside the printer can be overwritten each time the image registration unit of the printer operates, and the new printer ID number can be sent to the image registration device. The image registration device then saves the received printer ID number and corresponding image data in the registration log file. As a result, if a different image registration device changes the image data or information related to the image data saved in a printer, whether the information stored by the image registration device matches the information stored in the printer can be easily verified by comparing the printer ID number stored by the printer with the printer ID numbers recorded in the registration log file of the image registration device. This prevents a mismatch between the information stored by the printer and the information maintained by the image registration device in the event image data saved in the printer is mistakenly manipulated.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 3 shows parameters stored by the printer.

DESCRIPTION OF THE PREFERRED EMBODIMENTS

Preferred embodiments of a printer that can store images internally, an image registration method for registering images in the printer, and a printer system composed of the printer and image registration device according to the present invention are described below with reference to the accompanying figures.

Embodiment 1

A first embodiment of a printer, an image registration device, and a printer system according to the present invention are described first below.

Figure 1:
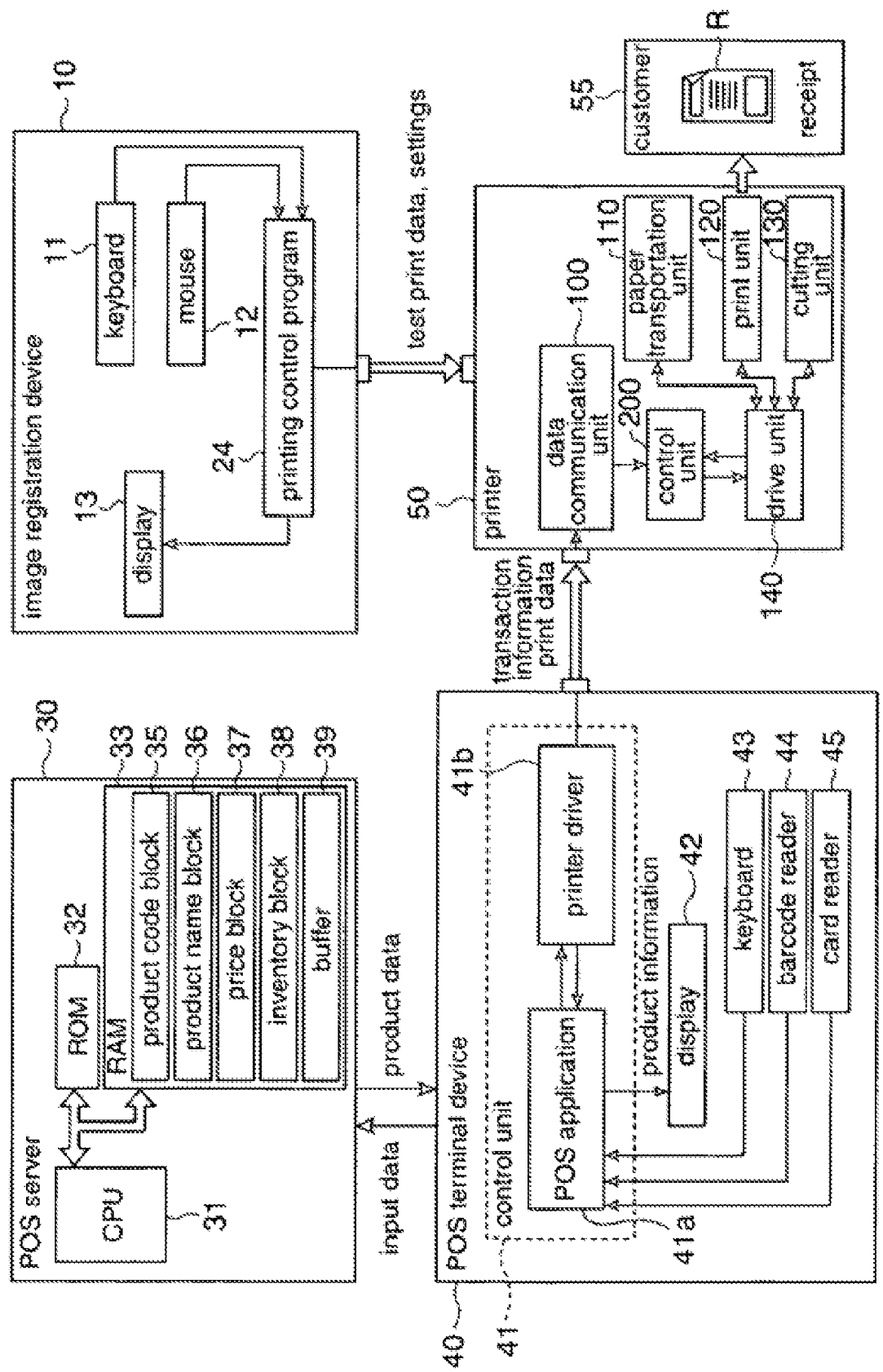
FIG. 1 is a block diagram of a POS system according to the present invention.
Figure 2:
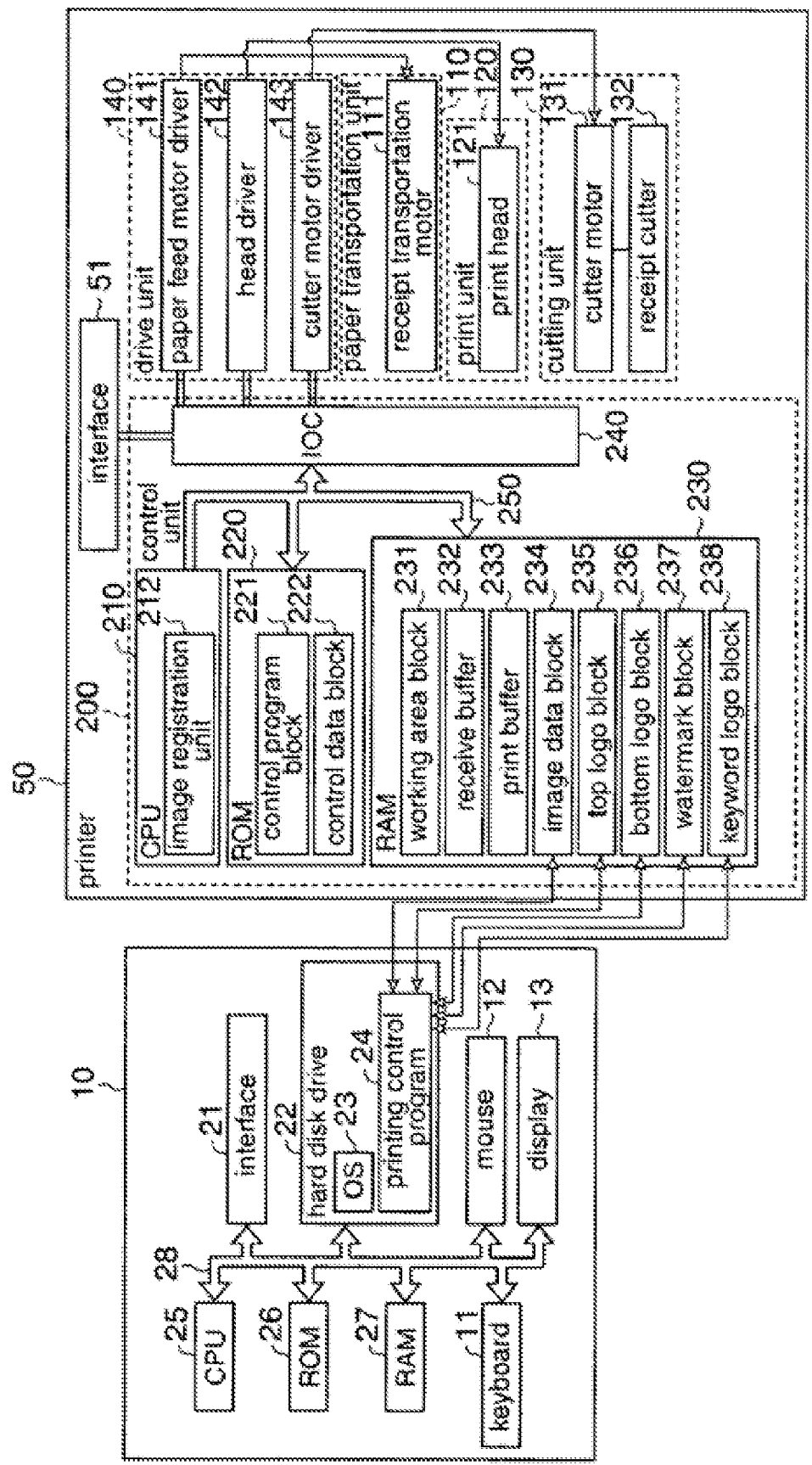
FIG. 2 is a control block diagram for a printer and image registration device according to a first embodiment of the invention.
Figure 4:
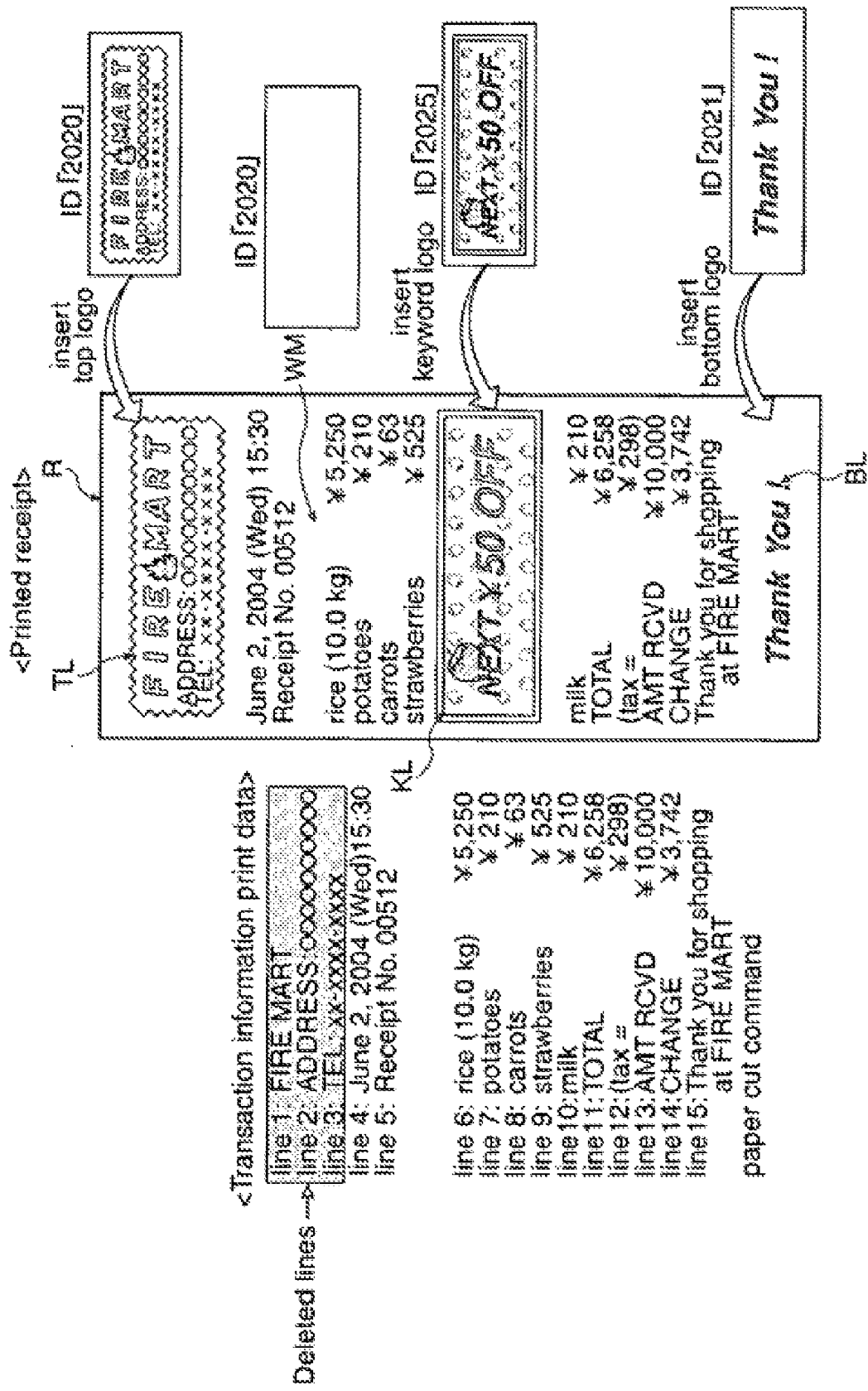
FIG. 4 describes the receipt design process.

FIG. 1 is a schematic block diagram of a POS system used by way of example as a printer system according to a first embodiment of the invention, FIG. 2 is a control block diagram of the image registration device and printer, FIG. 3 shows some of the parameters and arguments stored by the printer, and FIG. 4 shows an example of a receipt design process.

As shown in FIG. 1, the printer 50 in this embodiment of the invention is used in a POS system for printing receipts based on information relating to product sales entered by the store or other user. The printer 50 prints transaction information print data, which is generated by the POS application 41a running on the POS terminal device 40, received from the POS terminal device 40 to roll paper, and thus outputs a receipt. Based on previously stored print settings, the printer 50 runs a receipt design process (described in detail below) for adding image data to the transaction information print data received from the POS terminal device 40 to print a receipt. The parameters of this receipt design process are set by the image registration device 10 connected to the printer 50. This image registration device 10 is shown in FIG. 1 as a device separate from the POS terminal device 40, but the image registration device 10 and the POS terminal device 40 could be the same device.

The POS terminal device 40 is connected through a wireless or wired interface to the printer 50. The POS terminal device 40 acquires input data about the products from a keyboard 43 or barcode reader 44. The POS terminal device 40 reads a customer 55 credit card or membership card, for example, by means of a card reader 45 in order to acquire member information or the information needed to complete a credit card transaction. The POS terminal device 40 also has a display 42 for presenting product information generated from the product data sent from the POS server 30 in order to display the purchased products and prices for the customer 55 to see. These operations are controlled by the POS application 41a running on the POS terminal device 40. The POS application 41a generates the transaction information print data for printing on a receipt based on the product data sent from the POS server 30 and the input data, and sends the transaction information print data through the printer driver 41b to the printer 50.

In addition to a control device (CPU 31), the POS server 30 also has memory such as ROM 32 and RAM 33, and processes the information stored in a buffer 39 inside RAM 33 according to a control program stored in ROM 32. A product master composed of a product code block 35, product name block 36, price block 37, and inventory block 38 is stored in RAM 33. Based on input data sent from the POS terminal device 40, the CPU 31 extracts the product code, product name, and product price information from the product master, and generates the product data used for printing a receipt R and presentation on the display 42.

The printer 50 is a receipt printer composed of a data communication unit 100 for receiving control commands and transaction information print data from the POS terminal device 40, a paper transportation unit 110, a print unit 120, a cutting unit 130, a drive unit 140 for driving the paper transportation unit 110, print unit 120, and cutting unit 130, and a control unit 200 for controlling internal printer 50 operations.

As shown in FIG. 2, the control unit 200 has memory (RAM 230) for storing image data that is added to receipts and settings (see FIG. 3) relating to the image data, and based on these settings controls the receipt design process for adding logos to the receipts by inserting image data to the transaction information print data as further described below. The RAM 230 could be composed of a plurality of different memory elements physically separated according to function or application. The data communication unit 100 handles sending data to and receiving data from the image registration device 10.

The image registration device 10 is the host computer to which the printer 50 is connected, and runs a printing control program 24 for editing the image data added to the receipt R, registering image data in the printer 50, setting and getting parameter settings controlling the receipt design process, and testing printing using the printer 50. The user controls setting the parameters of the receipt design process of the printer 50 and test printing by means of the display 13 and input means such as a mouse 12 and keyboard 11. The image registration device 10 and printer 50 are connected through a wireless or wired interface. The image registration device 10 is connected to the printer 50 during image data editing and registration, when setting and getting the parameters of the receipt design process, and during test printing, and does not need to be always connected to the printer 50.

The control arrangement of the image registration device 10 and printer 50 is described next with reference to FIG. 2.

As shown in FIG. 2, the image registration device 10 comprises an interface 21 for exchanging data with the printer 50, a CPU 25, ROM 26, RAM 27, keyboard 11, mouse 12, display 13, and hard disk drive 22 connected to each other over a system bus 28.

In addition to the operating system (OS) and the printing control program 24 for test printing and configuring the printer 50, the hard disk drive 22 stores other application programs, configuration settings for the printing control program 24 and application programs, and a configuration file related to the startup display. The OS 23 is the basic software controlling the handling of input from the mouse 12 and keyboard 11, displaying data on the display 13, and running application programs.

The CPU 25 runs the OS 23 and printing control program 24, operations based on the application programs, and controls the image registration device 10. The ROM 26 stores the BIOS, the basic program controlling such devices as the keyboard 11, display 13, and hard disk drive 22. The OS 23 controls these devices by passing commands to the BIOS. RAM 27 is used by the CPU 25 as working memory for running application programs and the OS 23 read into RAM from the hard disk drive 22 or other storage medium (including such optical media as CD-ROM and CD-R discs).

The printer 50 has an interface 51 for data communication with the POS terminal device 40 and image registration device 10, a paper transportation unit 110 with a receipt transportation motor 111 for conveying receipts R, and a print unit 120 with a print head 121 for printing receipts synchronized to receipt R transportation. The printer 50 also has a cutting unit 130, a drive unit 140, and a control unit 200 for controlling internal printer 50 operations. The cutting unit 130 has a receipt cutter 132 and a cutter motor 131 for driving the receipt cutter 132 to sever the printed receipt R from the roll paper. The drive unit 140 has a paper feed motor driver 141, head driver 142, and cutter motor driver 143, and drives the motors and heads.

The control unit 200 comprises CPU 210, ROM 220, RAM 230, and an I/O (input/output) controller 240 interconnected via system bus 250. ROM 220 has a control program block 221 for storing a control program that is run by the CPU 210 to control printing and the receipt design process, and a control data block 222 for storing control data and tables used for printing and the receipt design process.

RAM 230 includes a working area block 231 used for storing flags and other data, a receive buffer 232, print buffer 233, and image data block 234. The receive buffer 232 temporarily stores print data received by the data communication unit 100 (see FIG. 1). The print buffer 233 stores print data after conversion to a format enabling printing by the print unit 120. The image data block 234 stores the image data that is printed as a logo at a desired position on the receipt R.

RAM 230 also includes a top logo block 235 for storing parameters related to the top logo TL, that is, the image data added to the top of the receipt R; a bottom logo block 236 for storing parameters related to the bottom logo BL, that is, the image data added to the bottom of the receipt R; a watermark block 237 for storing parameters related to the watermark WM printed on the receipt R; and a keyword logo block 238 for storing parameters related to the keyword logo KL, that is, image data that is added to the receipt R when triggered by a specific string of data. Based on these parameters, the CPU 210 processes and converts the print data received from the image registration device 10. The content of RAM 230 is also backed up in nonvolatile storage such as NVRAM so that the content will not be lost when the power turns off. The image data block 234, top logo block 235, bottom logo block 236, watermark block 237, and keyword logo block 238 could also be rendered in nonvolatile memory.

A logic circuit for complementing the functionality of the CPU 210 and handling interface signals to peripheral circuits is also rendered in the I/O controller 240 by means of gate arrays or a custom IC device, for example. The I/O controller 240 thus processes and then passes or directly passes print data and control data received from the POS terminal device 40 and image registration device 10 to the system bus 250, and in conjunction with the CPU 210 processes and then passes or directly passes data and control signals output from the CPU 210 to the system bus 250 to the print unit 120 and other function units.

Thus arranged, the CPU 210 receives input signals and data from the operating units of the printer 50 through the I/O controller 240 according to the control program stored in ROM 220. Based on these input signals and data, the CPU 210 processes data in RAM 230 and then outputs signals and data through I/O controller 240 to the function units of the printer 50 in order to control the printing process. An image registration unit 212 for registering and deleting images stored in a predetermined area of RAM 230 by running a control program is also rendered in CPU 210.

The receipt design function of the printer 50 is described next. The parameters related to processing image data in the receipt design process are described first below with reference to the parameters column of the table shown in FIG. 3.

The parameter settings stored in the top logo block 235 include the key code (referred to below as the ID) identifying the image data printed as the top logo TL, the positioning of top logo TL position (align left, center, align right), and the number of lines to delete. This number of lines to delete is set in order to delete the unnecessary part of the received transaction information print data so that the top logo TL does not overlap that portion of the received transaction information print data in the printed receipt, and denotes the number of lines to be deleted starting from the first line of the received transaction information print data.

The parameters stored in the bottom logo block 236 include the key code (referred to below as the ID) identifying the image data printed as the bottom logo BL, and the positioning of the bottom logo.

The parameters stored in the watermark block 237 include the key code (referred to below as the ID) identifying the image data printed as the watermark WM, the top margin L1 specifying the length from the top edge of the receipt to the printing position of the first watermark, the printing interval L2 defining the distance between watermarks, and the positioning of the watermark.

The parameters stored in the keyword logo block 238 include the key code (referred to below as the ID) identifying the image data printed as the keyword logo KL, the particular string of characters (referred to as the key code) that triggers printing the keyword logo KL, the printing position, and the number of lines to delete. When the character string defined as the key code is detected in the received transaction information print data, the keyword logo KL is printed based on the position of the character string in the print data. The number of lines to delete is defined for the same reason as the number of lines to delete is defined in the top logo TL parameters, and specifies the number of lines to delete starting from the first print line after the line on which the character string is detected. The printing position declared in the keyword logo KL parameters determines whether the keyword logo KL is printed instead of the detected character string, is inserted to the line following the character string, or is inserted to the line before the character string.

Examples of specific parameter values are shown in the lower part of FIG. 3.

FIG. 4 shows a sample of a receipt R resulting from applying the receipt design process based on the parameter values shown in FIG. 3. The image data with an ID (key code) of 2020 is set as the top logo TL, which is printed in the center at the top of the receipt R. Because the number of lines to delete is set to 3 for the top logo TL, the first three lines of transaction information print data starting from line 1 are deleted and not printed. Likewise, the image data with an ID (key code) of 2021 is set as the bottom logo BL and printed in the center at the end of the receipt R.

The image data identified by an ID (key code) of 2025 is set as the keyword logo KL, which is printed centered on the next line after the line in which the character string ("strawberry") defined as the keyword is detected (line 9 in this example). Furthermore, because the number of lines to delete for the keyword logo KL (the number of lines to delete for the keyword "strawberry" as further described below) is set to 0 in this example, the transaction information print data following the line containing the character string is printed and not deleted.

The image data with an ID (key code) of 2022 is set as the watermark WM, which is printed centered to the receipt R. The first watermark WM si printed starting 40 dots from the top of the receipt R, and the interval between watermarks WM is 20 dots as shown in FIG. 3 in this example. Note that while the top margin L1 and printing interval L2 are defined as the number of dots in this embodiment of the invention, the invention is not so limited, and inches, millimeters, or other unit can be used instead.

Registering the image data and setting the parameter values used in the receipt design process are described next. These processes are controlled by the printing control program 24 stored in the image registration device 10.

Figure 5:
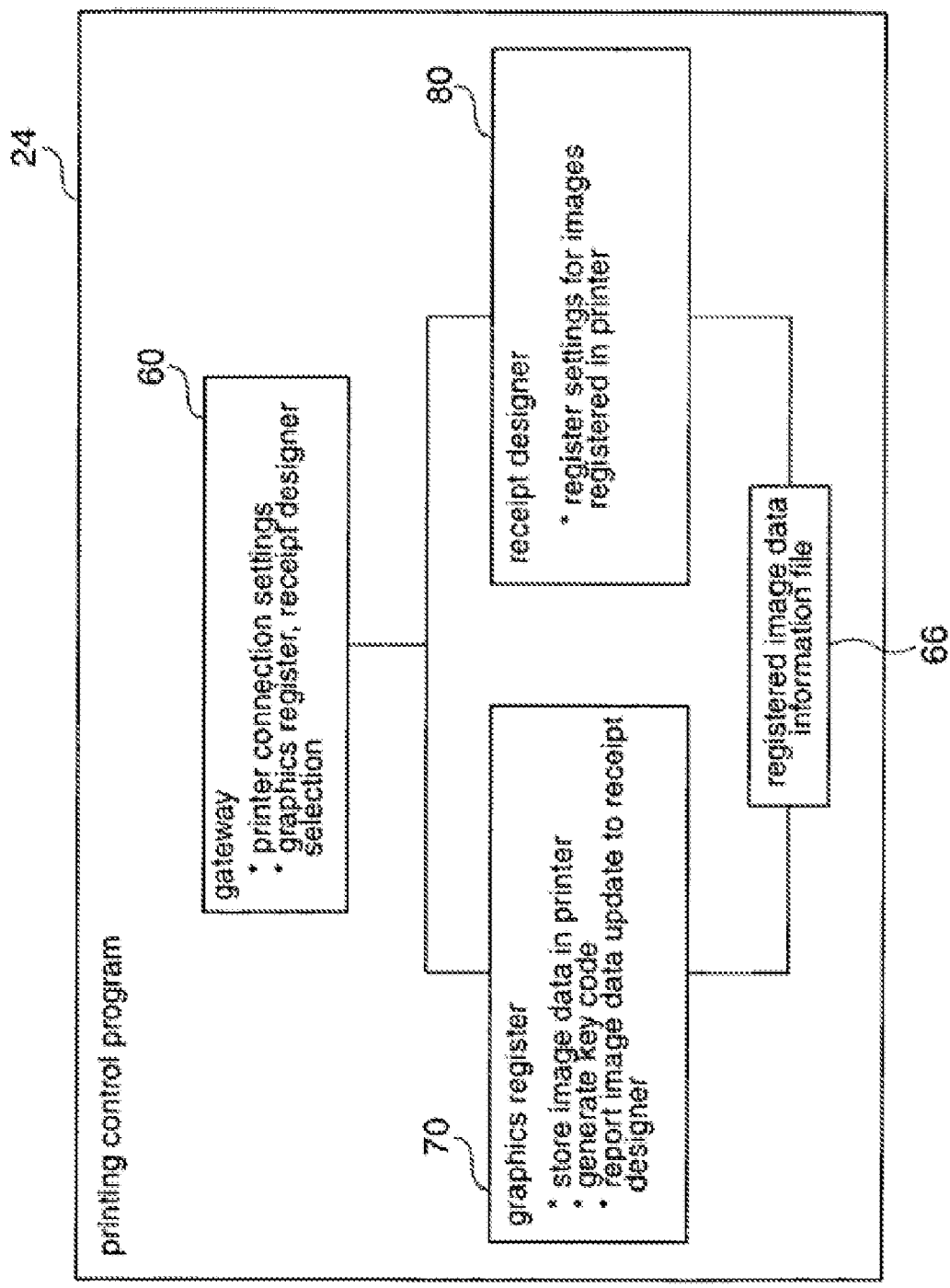
FIG. 5 is a block diagram of the printer control program.

FIG. 5 is a block diagram showing the printing control program 24.

As shown in FIG. 5, this printing control program 24 comprises three applications: a gateway 60 for connecting to the printer 50, a graphics register 70 for registering image data in the printer 50, and a receipt designer 80 for setting the parameter values applied to the images registered in the printer 50.

Figure 6:
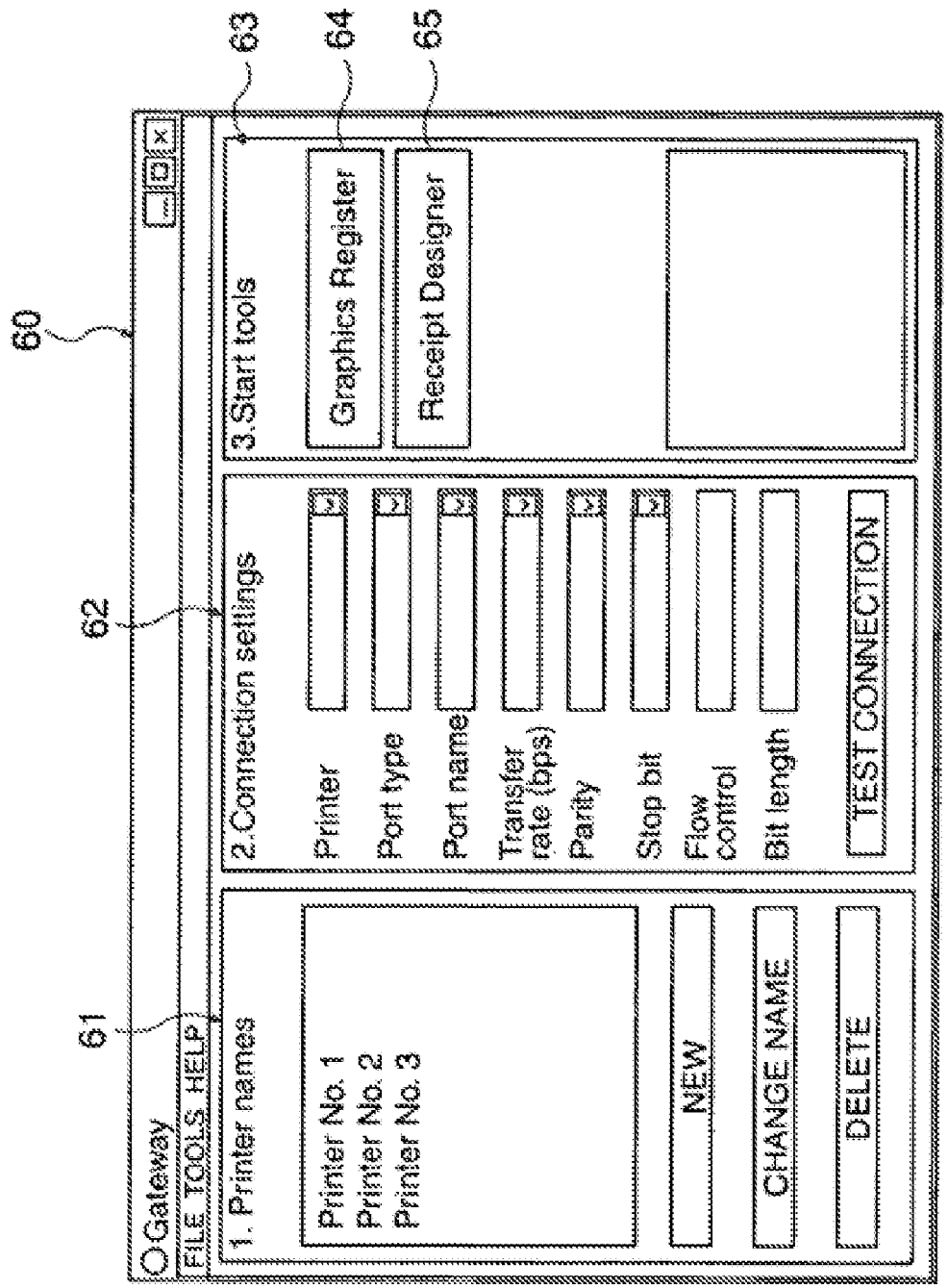
FIG. 6 shows a sample of a gateway window.

FIG. 6 shows an example of the gateway 60 application window.

The gateway 60 is an application for opening a connection to the printer 50 so that the graphics register 70 and receipt designer 80 can communicate with the printer 50. As shown in FIG. 6, the gateway 60 has a graphical user interface with a window presenting a connection name selection box 61 for saving and selecting printer connection names, a communication parameter box 62, and a tool selection box 63 for starting the graphics register 70 and receipt designer 80. The communication parameter box 62 enables setting the printer type, port type, port name, transfer rate, parity, stop bit, flow control, and bit length parameters for the printer corresponding to the connection name selected in the connection name selection box 61.

In order to register image data in the printer 50 or set the image handling parameters using the graphics register 70 or receipt designer 80, the user selects the target printer from the connection name selection box 61, and then clicks either button 64 or button 65 in the tool selection box 63. This selects and calls either the graphics register 70 or receipt designer 80 depending on whether button 64 or button 65 was selected. The selected tool, graphics register 70 or receipt designer 80, is thus activated with a communication connection open to the printer using the communication settings defined in the communication parameter box 62.

The graphics register 70 is an image registration application (program) with functions for registering image data in the printer 50. The graphics register 70 also uses a graphical user interface in this embodiment of the invention. The user stores various settings and image data using the tools displayed in the graphics register 70 window.

Figure 7:
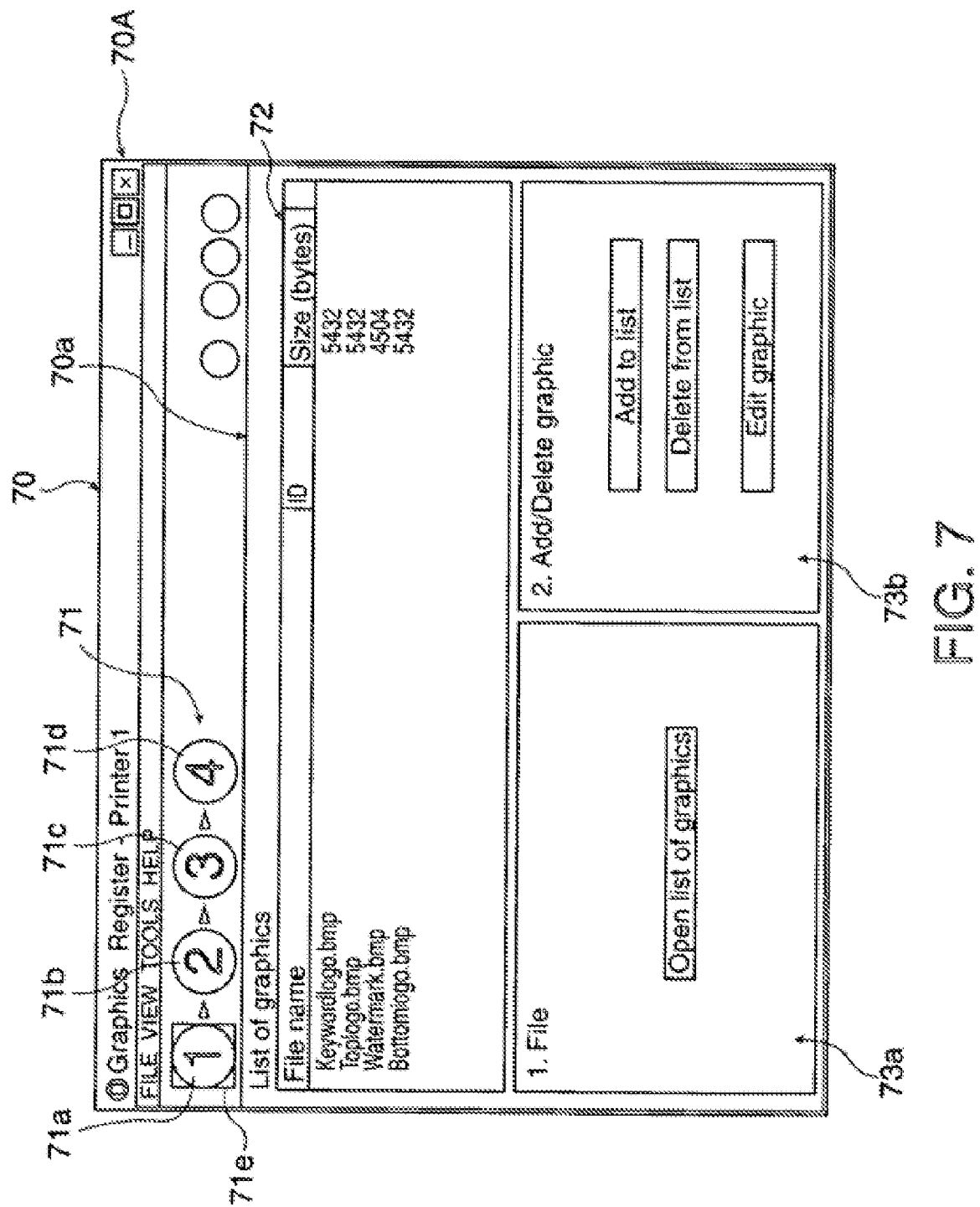
FIG. 7 shows an example of a screen displayed in a window of the graphics register.

FIG. 7 shows an example of a first screen 70*a* displayed inside window 70A of the graphics register 70.

As shown in FIG. 7, a work stage selection and display unit 71 containing four buttons 71*a* to 71*d* visually indicating the work stages until the image data (graphic) is registered in the printer is presented at the top of the first screen 70*a*. As the user clicks on the buttons shown in the work stage selection and display unit 71 of the graphics register 70, the content presented below the work stage selection and display unit 71 changes according to which button 71*a* to 71*d* was operated. Which button 71*a* to 71*d* is currently selected is denoted by a selection rectangle 71*e* displayed so that it encloses the selected button 71*a* to 71*d*. In the example shown in FIG. 7, the selection rectangle 71*e* indicates that button 71*a* identified as "1" is selected and first screen 70*a* is thus displayed.

An available graphics list box 72 presenting a list of the image files to be registered is provided in the middle of the first screen 70*a* shown in FIG. 7. Below the available graphics list box 72 are a list opening unit 73*a* for opening the list to be displayed in the list box 72, and a list editing unit 73*b* for adding graphics to the list, deleting graphics from the list, and editing a graphic selected from the displayed list. The user selects the source image file of the image data to be registered in the printer 50 from the first screen 70*a* shown in FIG. 7. The source image file is an image file stored in a local storage device of the image registration device 10. If the image registration device 10 is connected to another storage device over a network, image files stored on a network device can also be selected and used.

Figure 8:
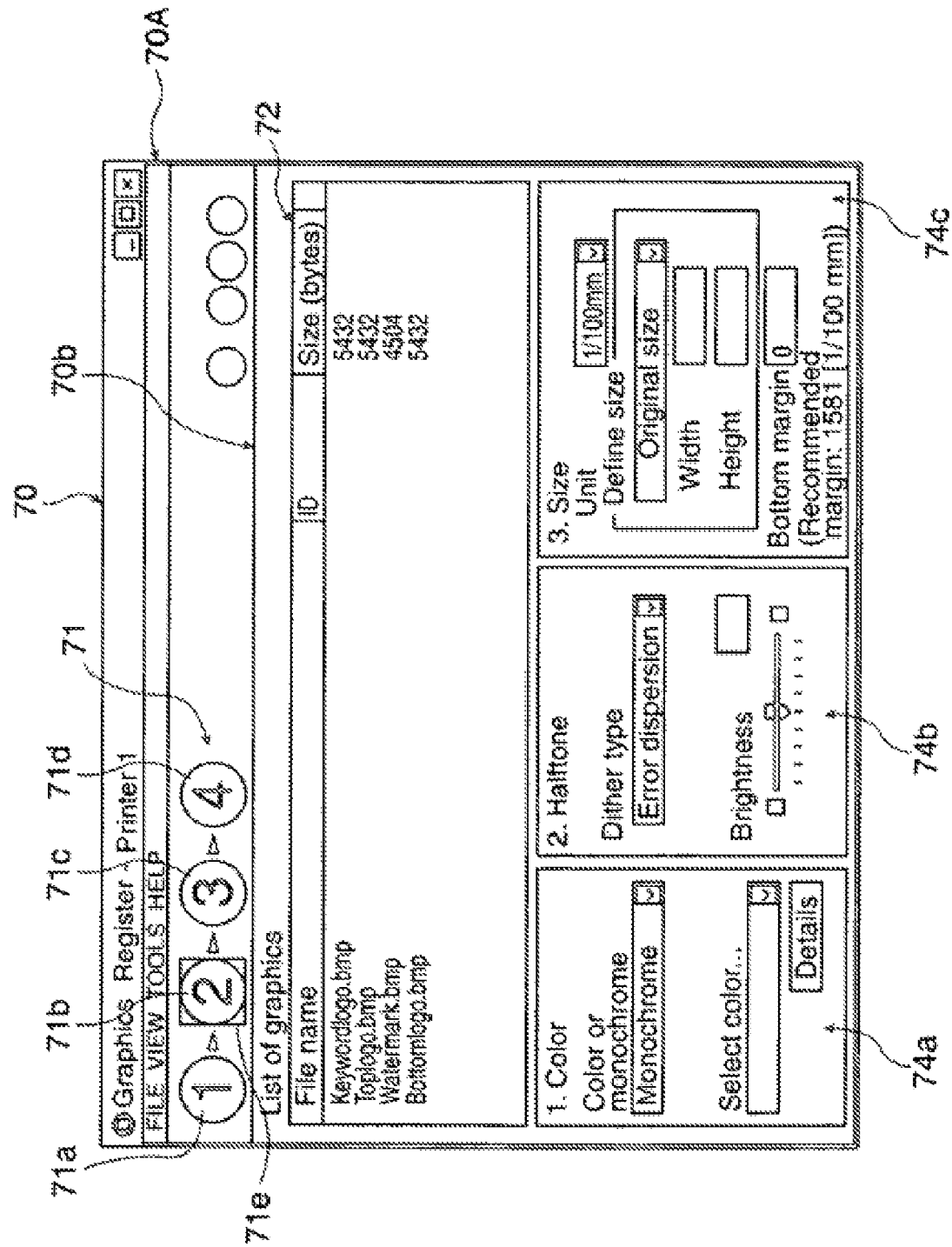
FIG. 8 shows an example of another screen displayed in a window of the graphics register.

FIG. 8 shows a second screen 70*b* displayed in the graphics register 70 window 70A.

In the second screen 70*b* shown in FIG. 8, a color configuration unit 74*a* for selecting monochrome or color printing and setting the color used for color printing, a halftone configuration unit 74*b* for setting the dither type and brightness, and a size definition unit 74*c* for setting the size of the printed image are rendered below the available graphics list box 72. The user defines the parameters of the image conversion process for generating the image data that is sent to the printer 50 based on the source image file in this second screen 70*b*. The user also defines the type of image conversion process that is applied to each of the image files listed in the list box 72 using the settings in the second screen 70*b* shown in FIG. 8.

Figure 9:
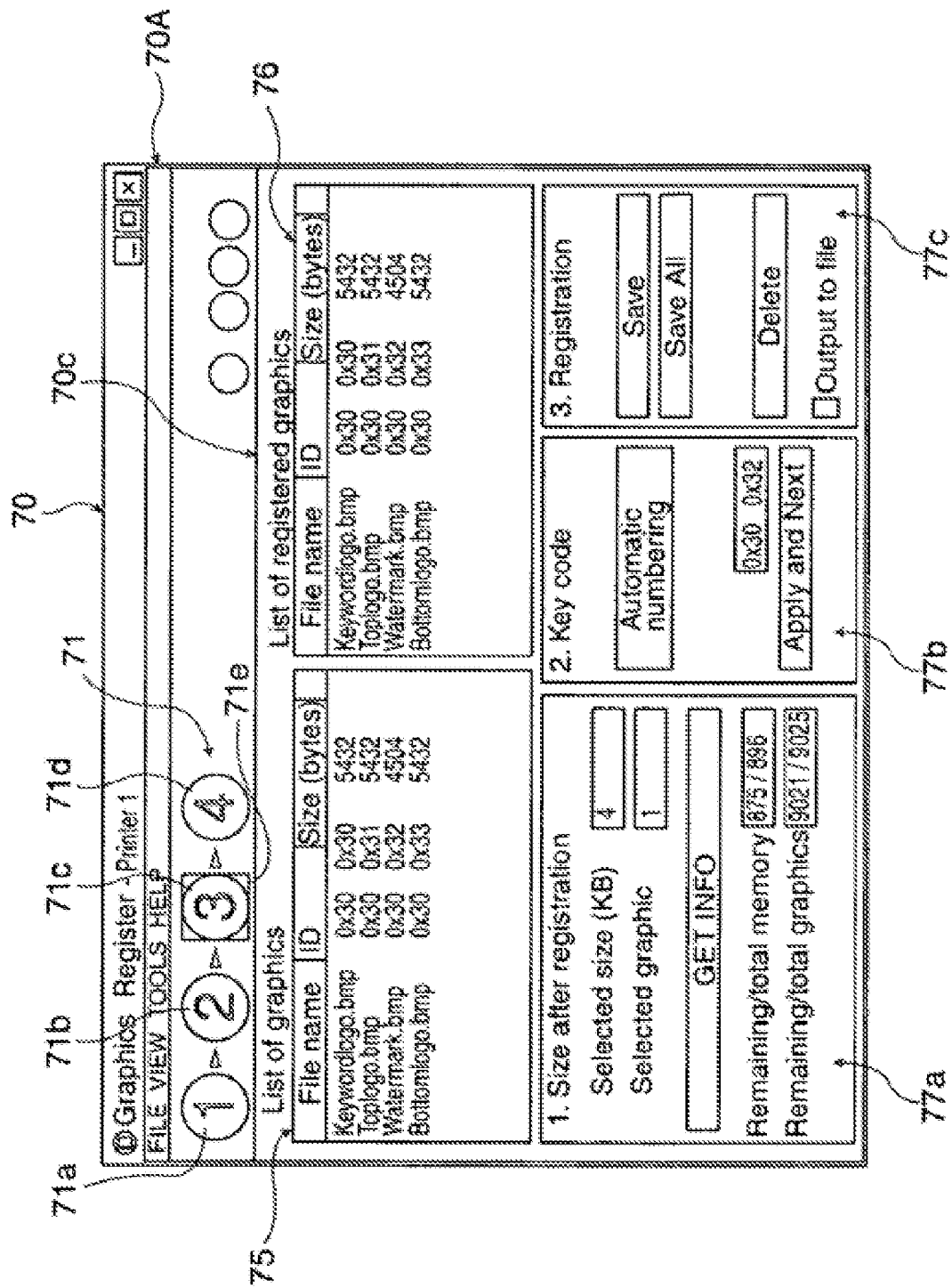
FIG. 9 shows an example of another screen displayed in a window of the graphics register.

FIG. 9 shows the third screen 70*c* displayed in the graphics register 70 window 70A.

As shown in FIG. 9, this third screen 70*c* is presented when the button 71*c* labelled "3" is selected in FIG. 7 or FIG. 8, and the content displayed below the work stage selection and display unit 71 is different from that displayed in the first screen 70*a* and second screen 70*b* shown in FIG. 7 and FIG. 8.

The area below the work stage selection and display unit 71 in the screen 70*c* shown in FIG. 9 includes a list box 75 identical to the list box 72 shown in FIG. 7 and FIG. 8, and a registered graphics list box 76 displaying a list of the image data that is actually stored in the printer 50. Below these lists are a registered size display unit 77*a* for displaying information about the size of a selected image when it is registered in the printer 50, a key code input unit 77*b* for setting the key code of an image, and an image data registration unit 77*c* for sending image data to, registering image data in, and deleting image data from the printer 50.

The user assigns the key code to the image data to be registered in the printer 50 using the screen shown in FIG. 9, and then clicks the Register button in the image data registration unit 77*c* to generate the image data to be registered in the printer 50 from the source image file based on the defined parameters and then send the converted image data to the printer 50. The image registration unit 212 of the printer 50 then writes the received image data in the printer 50 to RAM 230 together with the assigned key code. This operation of saving an image together with the assigned key code is referred to herein as "registering" the image.

In order to register an image in the printer 50, the graphics register 70 first gets the unique serial number (printer ID number) of the printer 50 from the printer 50. The graphics register 70 then records the location of the source image file from which the image data to be registered in the printer 50 is generated (that is, the logic path describing where the source image file is stored starting from the root directory), the key code, and the type and content (the number of colors, color reduction method, brightness, size, and bottom margin, for example) of the image conversion process applied to the image file in a registered image data information file (also referred to as a "registration log file") 66. The image registration device 10 may be connected to a plurality of printers, and a separate registration log file is therefore generated for each printer. The file name of the registered image data information file is therefore made unique to each printer by, for example, combining the printer name with the unique serial number.

This simple arrangement enables the graphics register 70 to know what image files are registered in a particular printer 50 and what type of image data was actually sent to the printer 50 by simply getting the key codes stored in the printer 50. The image data registered in the printer 50 is displayed in the registered graphics list box 76.

Figure 10:
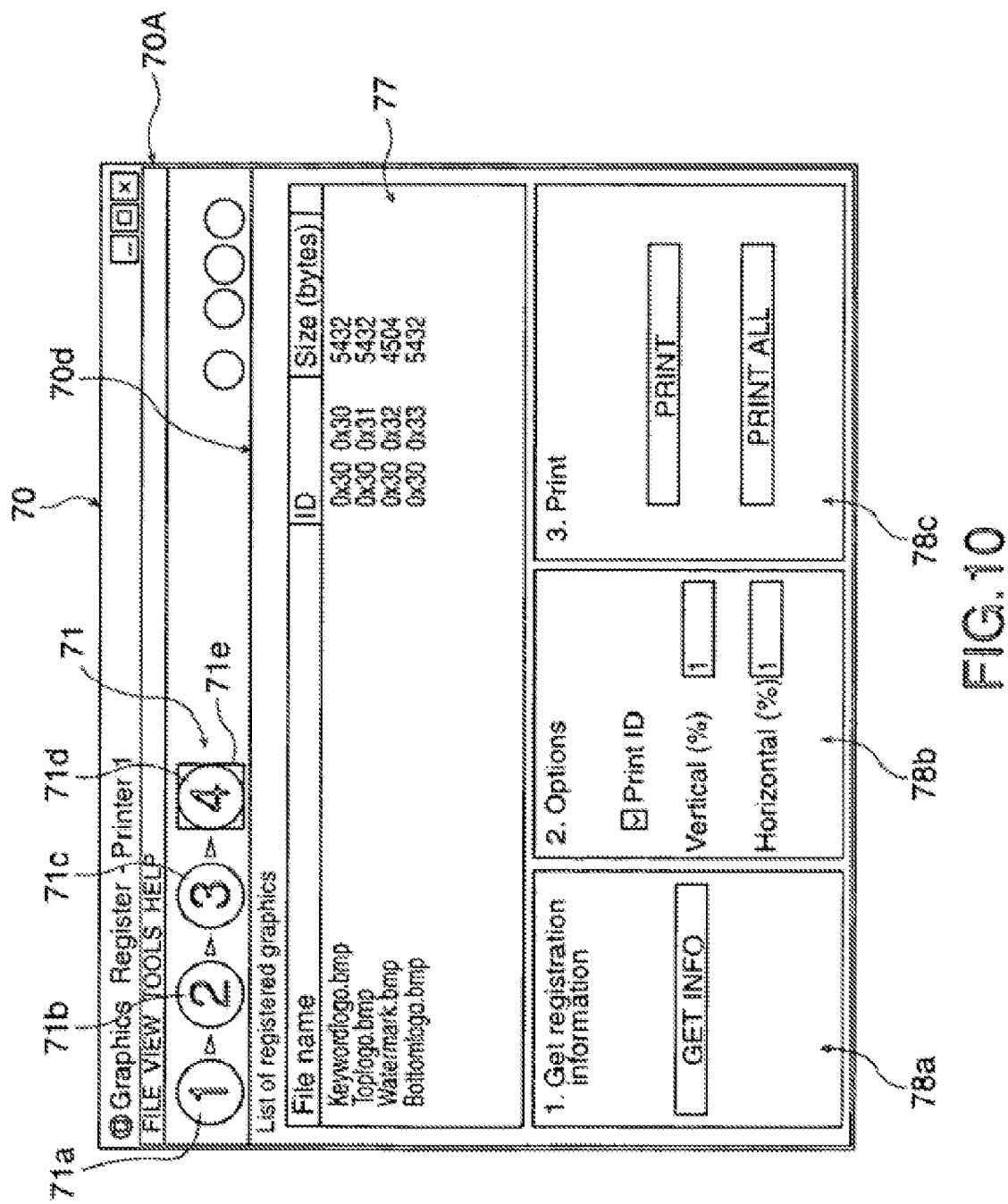
FIG. 10 shows an example of another screen displayed in a window of the graphics register.

FIG. 10 shows a fourth screen 70*d* presented in the graphics register 70 window 70A.

As shown in FIG. 10, this fourth screen 70*d* is presented when the button 71*d* labelled "4" is selected in FIG. 7, FIG. 8, or FIG. 9, and the content displayed below the work stage selection and display unit 71 is different from that displayed in the screens 70*a*, 70*b*, and 70*c* shown in FIG. 7, FIG. 8 and FIG. 9, respectively.

The area below the work stage selection and display unit 71 in the screen 70*d* shown in FIG. 10 includes a registered graphics list box 77 identical to the registered graphics list box 76 shown in FIG. 9. Below this registered graphics list box 77 are a registered information acquisition unit 78*a* for getting information about the image data registered in the printer 50, an options unit 78*b* for defining optional settings, and a printing control unit 78*c* for printing image data that is registered in the printer 50.

When the user clicks on the GET INFO button in the registered information acquisition unit 78*a*, the graphics register 70 queries the printer 50 to get only the key codes for the image data registered in the printer 50. The graphics register 70 then uses these key codes to read the registered image data information file 66 and display the name of the source image file, the key code, and the size of the registered image data in the registered graphics list box 77. The user can then use the options unit 78*b* to set the desired options, and use the printing control unit 78*c* to tell the printer 50 to print all of the images listed in the registered graphics list box 77 or just the selected images. To print a particular image, the graphics register 70 simply sends the key code with the print command to the printer 50.

By thus maintaining a registered image data information file 66 listing the image data and corresponding key codes registered in the printer 50, the graphics register 70 can easily manage image data information based on the key codes, can list the images registered in the printer 50 when requested by the user, and can tell the printer 50 to print any or all of the registered images.

The receipt designer 80 is described in detail next.

The receipt designer 80 is a parameter configuration application (parameter configuration means, parameter configuration program) with functions for configuring the images registered in the printer 50. These parameters include the printing position of the image data (top, bottom watermark, and keyword logos), and details related to the printing position. The user can thus control what image data is printed at what position by using the graphics register 70 to register image data in the printer 50 and using the receipt designer 80 to define in detail where the image data will be printed on the receipt.

The receipt designer 80 also uses a graphical user interface. The user clicks on buttons to access different parameter settings. Note that the receipt designer 80 has a window structure different from the graphics register 70, and the receipt designer 80 can also be started once the graphics register 70 is running.

Figure 11:
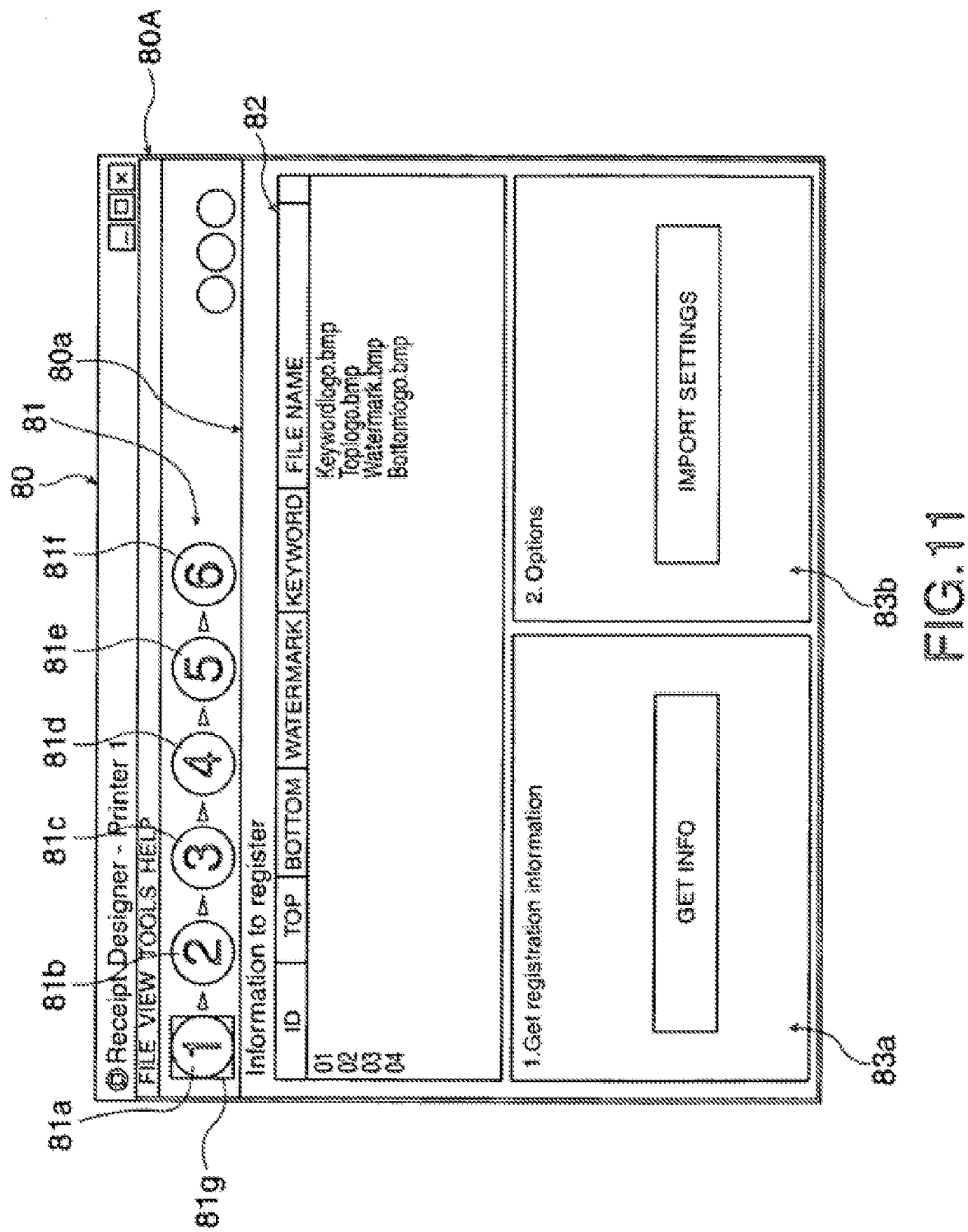
FIG. 11 shows an example of a screen displayed in a window of the receipt designer.

FIG. 11 shows a first screen 80*a* that is presented in the main window 80A of the receipt designer 80.

As shown in FIG. 11, a work stage selection and display unit 81 containing six buttons 81*a* to 81*f* visually indicating the work stages required to configure the image data (graphics) is presented at the top of the first screen 80*a*. As the user clicks on the buttons shown in the work stage selection and display unit 81 of the receipt designer 80, the content presented below the work stage selection and display unit 81 changes according to which button 81*a* to 81*f* was clicked. Which button 81*a* to 81*f* is currently selected is denoted by a selection rectangle 81*g* displayed so that it encloses the selected button 81*a* to 81*f*. In the example shown in FIG. 11, the selection rectangle 81*g* indicates that button 81*a* identified as "1" is selected and first screen 80*a* is thus displayed.

A registered graphics list box 82 presenting a list of the image files registered in the printer 50 is provided in the middle of the first screen 80*a* shown in FIG. 11. Below the registered graphics list box 82 is registered information acquisition unit 83*a* for getting a list of registered graphics from the printer, and an options unit 83*b* for importing settings from an external file.

When the user clicks on the GET INFO button in the registered information acquisition unit 83*a*, the receipt designer 80 queries the printer 50 to get the printer serial number, the key codes of images registered in the printer, and the parameter settings for the registered images, and displays the information in the registered graphics list box 82. The receipt designer 80 then uses these key codes and the printer name to find the corresponding registered image data information file 66, and then reads the registered image data information file 66 to display the names of the source image files corresponding to the image key codes (IDs) in the registered graphics list box 82. The image data shown in the list in FIG. 11 includes images for which the parameters have not yet been set and the printing position and other details are therefore not yet determined.

When the user uses the mouse to click on the file name of a particular image in the registered graphics list box 82 in order to see a preview of a particular image registered in the printer 50, the receipt designer 80 reads the registered image data information file 66 to apply the same image conversion process to the source image file and present a preview of the result on the screen.

FIG. 12 to FIG. 16 show a second screen 80*b*, third screen 80*c*, fourth screen 80*d*, fifth screen 80*e*, and sixth screen 80*f* presented in the receipt designer 80 window 80A.

Figure 12:
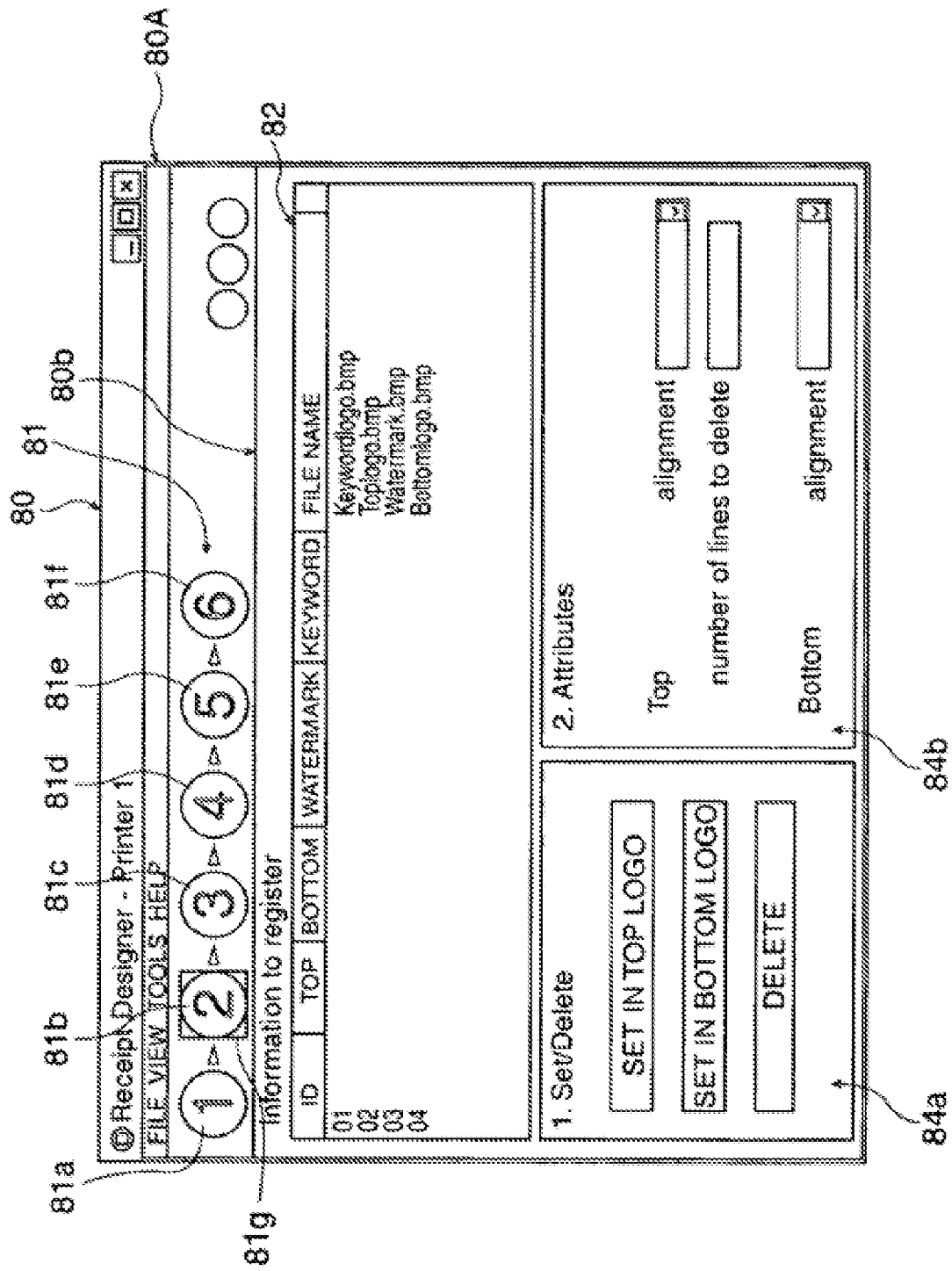
FIG. 12 shows an example of another screen displayed in a window of the receipt designer.

The second screen 80*b* shown in FIG. 12 is described first.

When the button 81*b* denoted "2" in the work stage selection and display unit 81 is clicked, the content of the area below the registered graphics list box 82 in the first screen 80*a* shown in FIG. 11 changes to the second screen 80*b* shown in FIG. 12. The second screen 80*b* shown in FIG. 12 is used to set an image listed in the registered graphics list box 82 as the top logo or bottom logo. The user selects an image from the list in registered graphics list box 82 and then clicks one of the buttons in the Set/Delete unit 84*a* to set the selected image as the top logo or bottom logo. Detailed print settings for the selected image are set in the attribute unit 84*b*. This saves the settings for the selected image in the receipt designer 80, but does not send the settings to the printer 50.

Figure 13:
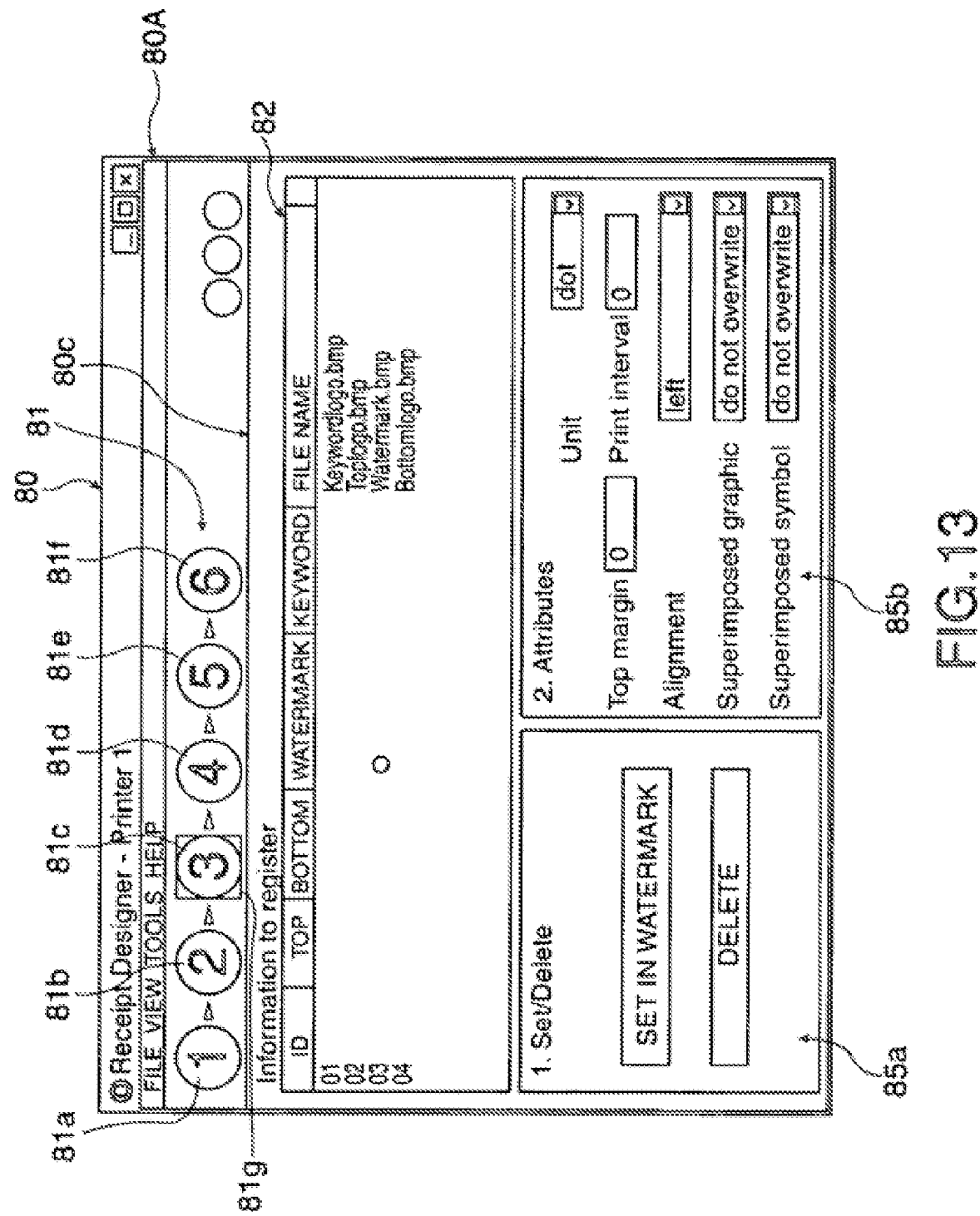
FIG. 13 shows an example of another screen displayed in a window of the receipt designer.

The third screen 80*c* shown in FIG. 13 is described next.

When the button 81*c* denoted "3" in the work stage selection and display unit 81 is clicked, the content of the area below the registered graphics list box 82 in the first screen 80*a* shown in FIG. 11 changes to the third screen 80*c* shown in FIG. 13. The third screen 80*c* shown in FIG. 13 is used to set an image listed in the registered graphics list box 82 as the watermark. The user selects an image from the list in registered graphics list box 82 and then clicks the button in the Set/Delete unit 85*a* to set the selected image as the watermark. Detailed print settings for the selected image are set in the attribute unit 85*b*. This saves the settings for the selected image in the receipt designer 80, but does not send the settings to the printer 50.

Figure 14:
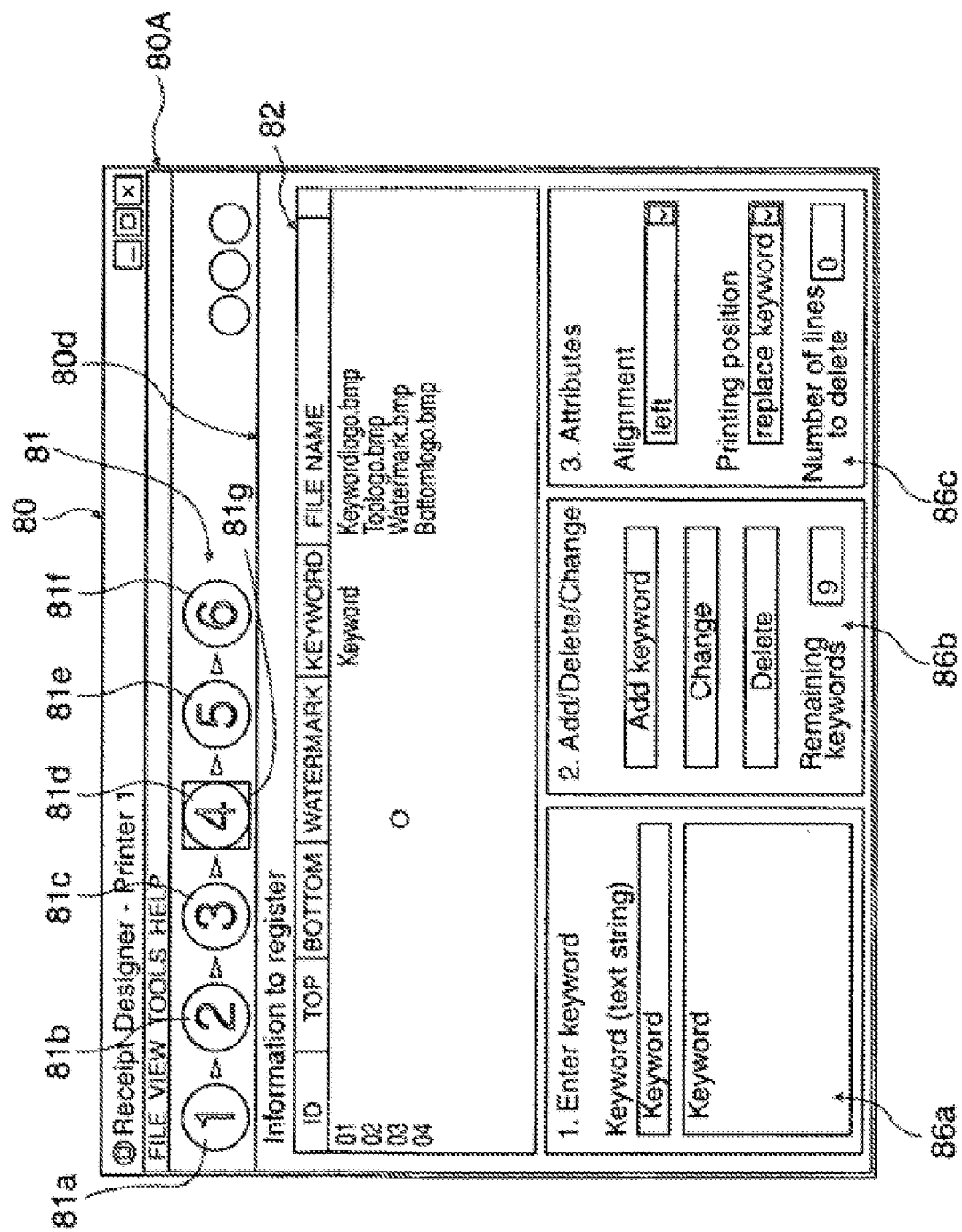
FIG. 14 shows an example of another screen displayed in a window of the receipt designer.

The fourth screen 80*d* shown in FIG. 14 is described next.

When the button 81*d* denoted "4" in the work stage selection and display unit 81 is clicked, the content of the area below the registered graphics list box 82 in the first screen 80*a* shown in FIG. 11 changes to the fourth screen 80*d* shown in FIG. 14. The fourth screen 80*d* shown in FIG. 14 is used to set an image listed in the registered graphics list box 82 as a keyword logo. The user selects an image from the list in registered graphics list box 82, then enters the keyword in the keyword input box 86*a*, and then clicks the Add Keyword button in the Add/Delete/Change unit 86*b* to register the selected image as a keyword logo. Detailed print settings for the selected image are set in the attribute unit 86*c*. This saves the settings for the selected image in the receipt designer 80, but does not send the settings to the printer 50.

Figure 15:
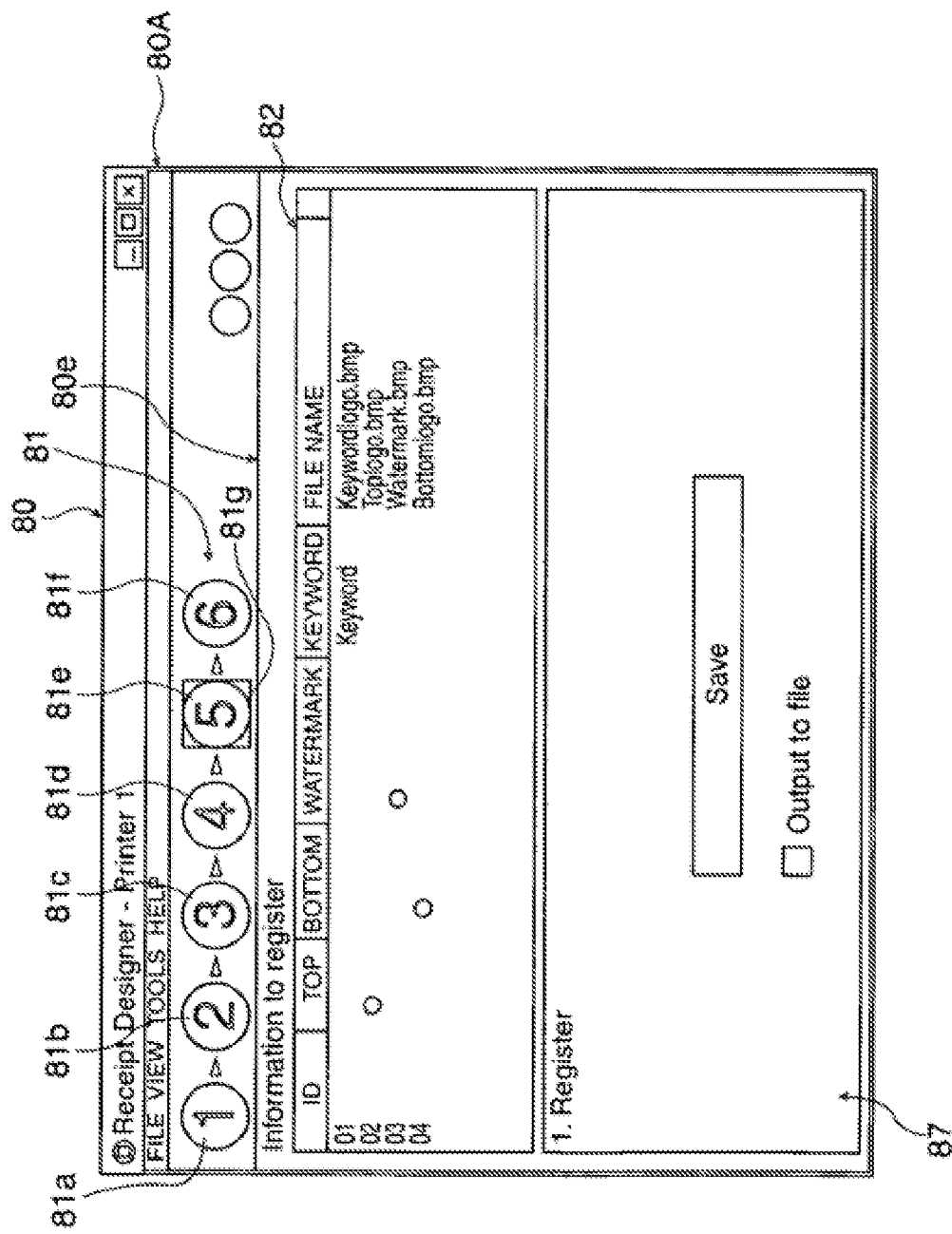
FIG. 15 shows an example of another screen displayed in a window of the receipt designer.

The fifth screen 80*e* shown in FIG. 15 is described next.

When the button 81*e* denoted "5" in the work stage selection and display unit 81 is clicked, the content of the area below the registered graphics list box 82 in the first screen 80*a* shown in FIG. 11 changes to the fifth screen 80*e* shown in FIG. 15. The fifth screen 80*e* shown in FIG. 15 is used for sending the image parameter settings to the printer 50. When the user clicks the Save button in the registration unit 87, the parameter settings saved by the receipt designer 80 are output to the printer 50 together with the key codes. When the key codes and settings are received by the printer 50, the image registration unit 212 saves the key codes (IDs) and corresponding settings to the top logo block 235, bottom logo block 236, watermark block 237, and keyword logo block 238 appropriately. This completes setting the printing parameters for the image data saved in the printer 50.

The receipt designer 80 can also save the settings output to the printer in a separate file. This file can be the registered image data information file generated by the graphics register 70, and the settings from the receipt designer 80 can be appended to the registered image data information file.

Figure 16:
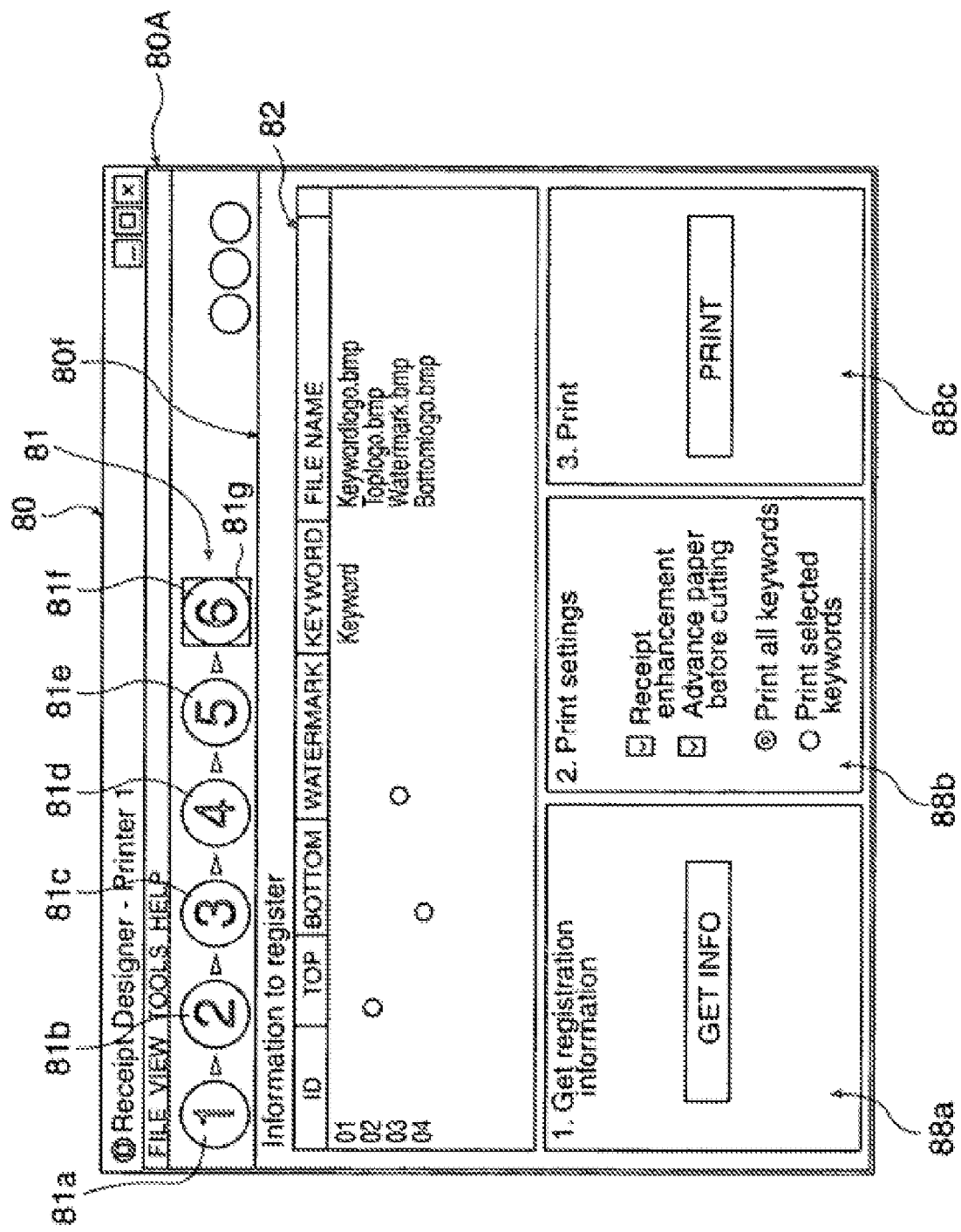
FIG. 16 shows an example of another screen displayed in a window of the receipt designer.

The sixth screen 80f shown in FIG. 16 is described next.

When the button 81f denoted "6" in the work stage selection and display unit 81 is clicked, the content of the area below the registered graphics list box 82 in the first screen 80a shown in FIG. 11 changes to the sixth screen 80f shown in FIG. 16. The sixth screen 80f shown in FIG. 16 is used for getting, printing, and displaying settings from the printer 50. The user uses the registered information acquisition unit 88a to get the stored parameter settings from the printer 50, uses the print settings unit 88b to setup printing, and then uses the print unit 88c to print. The image registration device 10 sends the printer initialization command and a test print pattern to the printer 50 to print.

By thus sending key codes and settings to the printer 50, the receipt designer 80 can thus define the printing position of the image data registered by the graphics register 70 together with detailed print settings.

The interaction of the graphics register 70 and receipt designer 80 is described next.

As described above, the graphics register 70 and receipt designer 80 do not acquire image data from the printer 50. The graphics register 70 generates a registered image data information file 66 when the image data is registered, and thereafter the graphics register 70 and receipt designer 80 get only the serial number of the printer 50 and the key codes of the registered image data from the printer 50. This registered image data information file can then be read to print and preview the images corresponding to each key code.

Image data registration, deletion, and preview operations in this embodiment of the invention are described next below with reference to the accompanying flow charts, starting with the flow chart shown in FIG. 17.

Figure 17:
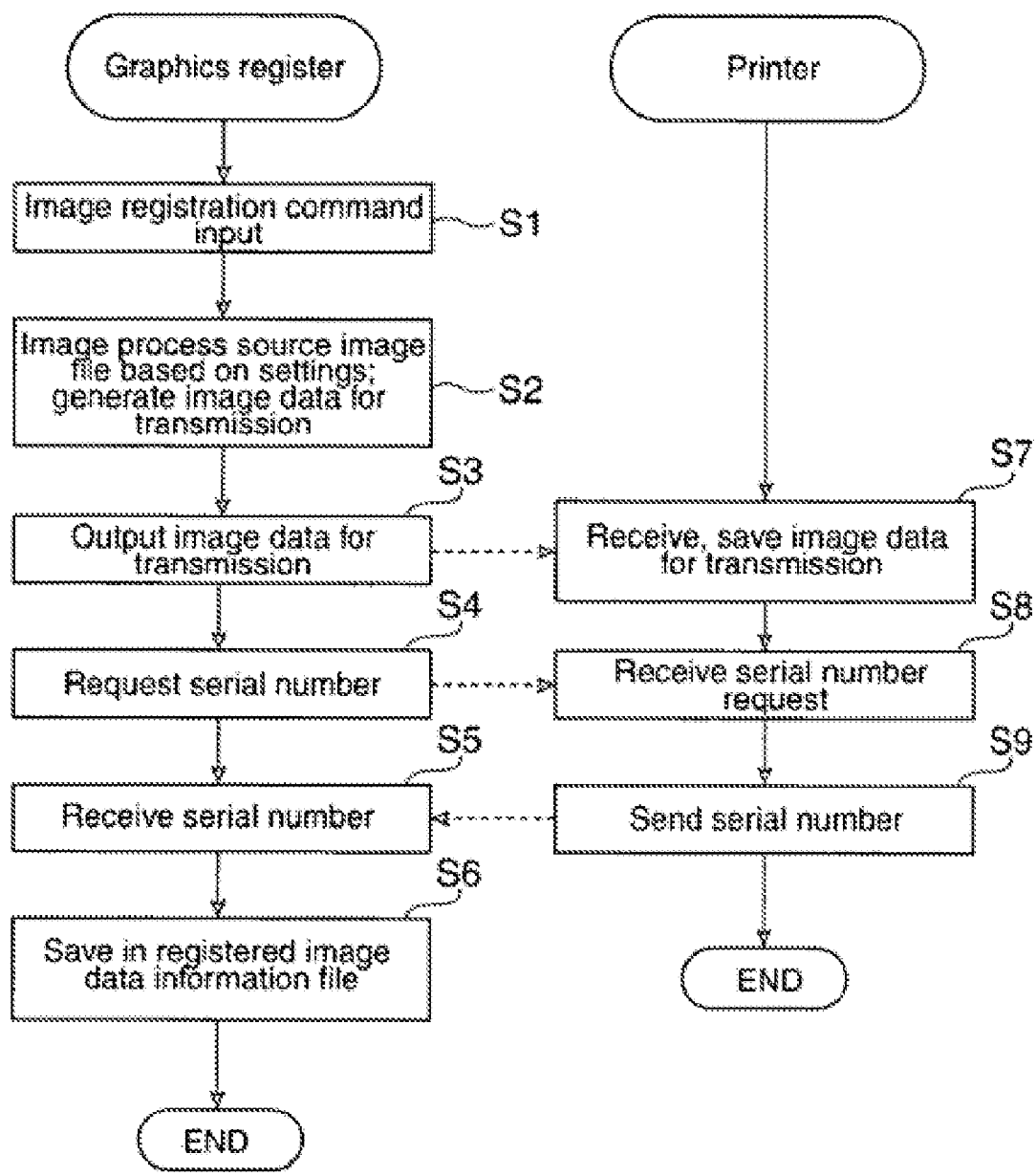
FIG. 17 is a flow chart of a process for registering image data in a printer according to a first embodiment of the invention.

FIG. 17 is a flow chart of the process for registering image data in the printer 50.

When the user uses the image data registration unit 77c in the third screen 70c shown in FIG. 9 to input an image registration command to the graphics register 70 (step S1), the graphics register 70 processes the source image file based on the number of colors, color reduction method, brightness, size, and bottom margin settings defined for the image data to generate the image data to be registered in the printer (step S2). The graphics register 70 then sends the resulting image data together with the key code to the printer 50 (step S3).

When the printer 50 receives the image data, the image registration unit 212 saves the image data with the key code to the image data block 234, and thus registers the image data (step S7).

When sending image data to the printer 50 is finished, the graphics register 70 asks the printer 50 to return the serial number unique to the printer 50 (step S4).

When the printer 50 receives a serial number request (step S8), the printer 50 reads the serial number stored in a nonvolatile area of RAM 230 (or ROM 220), and sends the serial number to the image registration device 10, or more specifically the graphics register 70 (step S9).

When the graphics register 70 receives the serial number from the printer 50 (step S5), the graphics register 70 saves the logic path to the source image file from which the image data registered in the printer 50 was generated, the key code, and the type and content of the image conversion process applied to the image file (such as the number of colors, color reduction method, brightness, size, and bottom margin) in the registered image data information file (registration log file) 66. The file name for the registered image data information file 66 in this embodiment of the invention is the printer name plus the printer serial number, and is thus unique to each printer.

As a result, when the graphics register 70 or receipt designer 80 thereafter needs to reference the image file for registered image data, the graphics register 70 or receipt designer 80 can find the corresponding registration log file using the printer name and printer serial number, and can thus confirm the content that was sent to the printer without receiving the actual image data from the printer.

Figure 18:
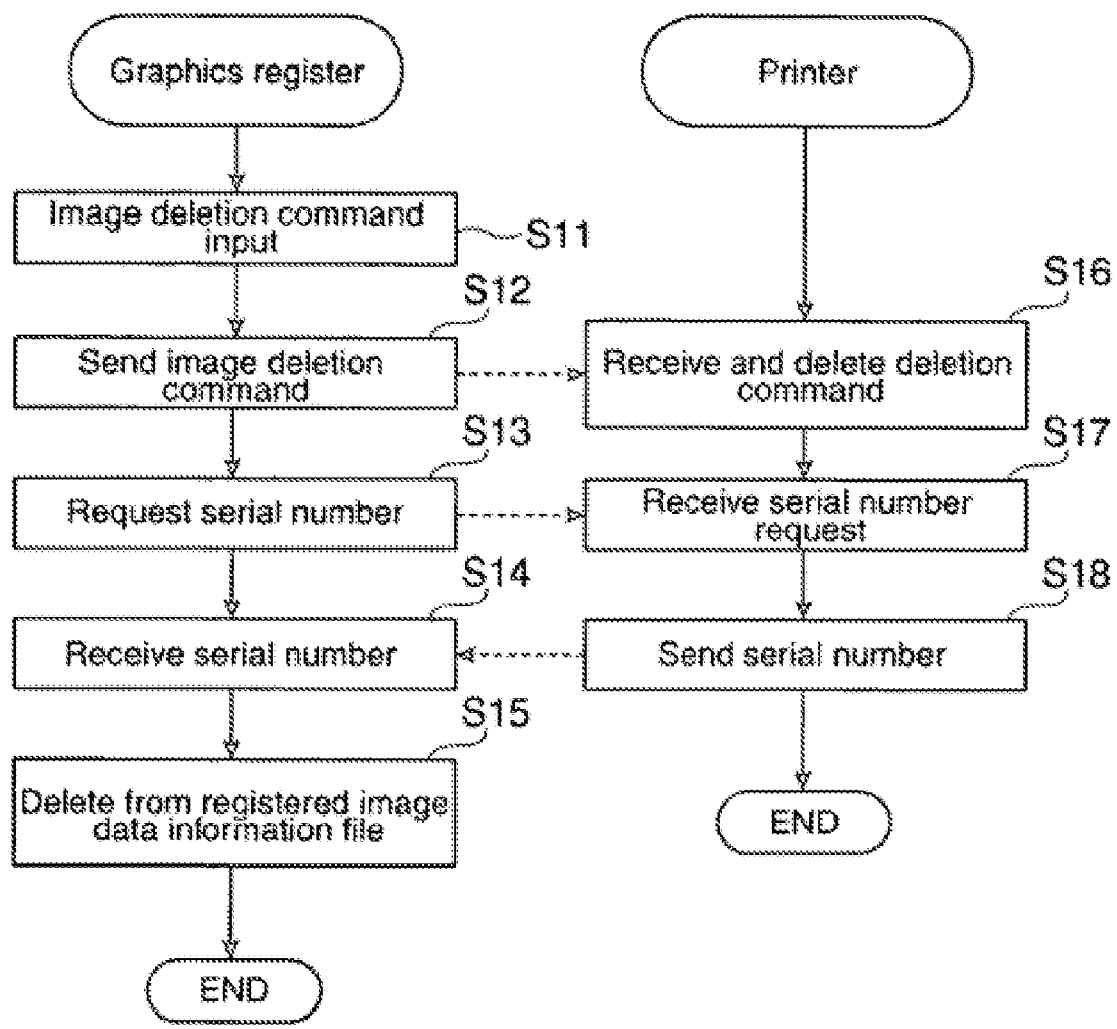
FIG. 18 is a flow chart of a process for deleting image data in a printer according to a first embodiment of the invention.

FIG. 18 is a flow chart of the process for deleting image data from the printer 50.

When the user asserts an image deletion command to the graphics register 70 using the image data registration unit 77c in the third screen 70c shown in FIG. 9 (step S11), the graphics register 70 sends a delete command specifying the key code of the image data to be deleted to the printer 50 (step S12).

When the printer 50 receives this delete command (step S16), the image registration unit 212 deletes the image data corresponding to the key code declared in the delete command from the image data block 234.

The graphics register 70 then asks the printer 50 to return the serial number unique to the printer 50 (step S13).

When the printer 50 receives the serial number request (step S17), the printer 50 reads the serial number stored in a nonvolatile area of RAM 230 (or ROM 220), and sends the serial number to the image registration device 10, or more specifically the graphics register 70 (step S18).

When the graphics register 70 receives the serial number from the printer 50 (step S14), the graphics register 70 locates the registration log file corresponding to the printer name and the serial number received from the printer 50, and deletes the information (the key code, file path, number of colors, color reduction method, brightness, size, and bottom margin, for example) relating to the image data to be deleted from the corresponding registered image data information file (step S15).

When image data is deleted from the printer 50 in this embodiment of the invention, the corresponding information is also deleted from the registered image data information file that is maintained by the graphics register 70. As a result, the image data that is actually stored in the printer 50 always matches the information about the image data registered in the printer 50 that is stored by the image registration device 10. It is therefore not necessary for the printer 50 to send image data to the image registration device 10, and a system that is easy to use can be rendered even if the data transfer rate of the communication interface is slow.

Figure 19:
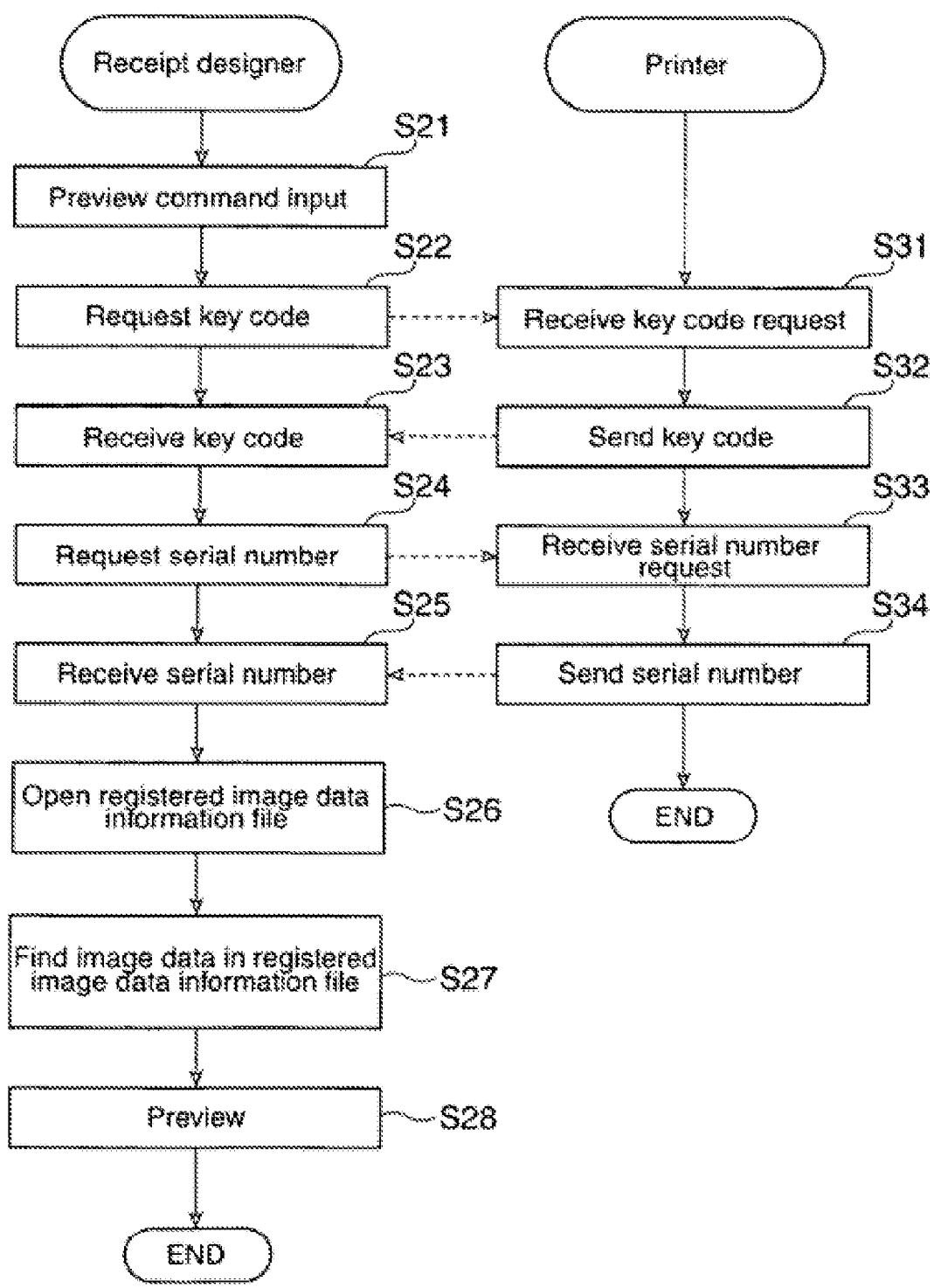
FIG. 19 is a flow chart of a process for previewing image data in a printer according to a first embodiment of the invention.

FIG. 19 is a flow chart of the process for previewing image data that is registered in the printer 50. In the operation described below the receipt designer 80 is not communicating with the printer 50 and presents a preview without receiving a key code from the printer 50.

When the user inputs a preview display command to the receipt designer 80 (step S21), the receipt designer 80 instructs the printer 50 to return the key codes for the images registered in the printer (step S22).

When the printer 50 receives the key code request (step S31), the image registration unit 212 reads and sends the list of key codes stored in the image data block 234 of RAM 230 to the receipt designer 80 (step S32).

When the receipt designer 80 receives the key code list from the printer 50 (step S23), the receipt designer 80 requests the 500 to send the serial number unique to the printer 50 (step S24).

When the printer 50 receives the serial number request (step S33), the printer 50 reads the serial number stored in a nonvolatile area of RAM 230 (or ROM 220), and sends the serial number to the image registration device 10, or more specifically the receipt designer 80 (step S34).

When the receipt designer 80 receives the serial number from the printer 50 (step S25), the receipt designer 80 finds the registration log file corresponding to the printer name and serial number received from the printer, and opens the registered image data information file 66 (step S26). The receipt designer 80 then reads the file path stored in the registered image data information file 66 to locate the image data file (step S27), applies the same image conversion process using the number of colors, color reduction method, brightness, size, and bottom margin parameters read from the registration log file, and presents a preview (step S28).

The receipt designer 80 in this embodiment of the invention can thus display a preview of the image data by receiving only the image data key code and printer serial number from the printer 50. Because the receipt designer 80 thus does not receive the image data from the printer 50, and a system that is easy to use can be rendered even if the data transfer rate of the communication interface is slow.

This embodiment of the invention receives a serial number from the printer 50 to maintain the integrity of the correlation between the registered image data information files and printers when the image registration device 10 is connected to more than one printer and registers image data in a plurality of printers. The invention is not limited to using a serial number, however, and any value that uniquely identifies each printer can be used. The graphics register 70, for example, could generate and store a specific code for each printer in the printer, and use this generated code to identify each printer.

This embodiment of the invention is also described using the receipt designer 80 to present image previews. If the graphics register 70 is rendered with the same preview function, however, the graphics register 70 can present a preview by executing the same steps described in FIG. 19.

A separate registration log file is also stored for each printer identification number in this embodiment of the invention, but if the correlation between the printer ID number and image registration information (key code, file path, and image processing method) is maintained, information for more than one printer can be maintained in a single file, in a database, or in a registry, for example.

A printer, image registration method, and printer system according to a further embodiment of the invention are described next below.

In the earlier embodiments of the invention described above, the image registration device 10 receives a unique printer serial number from the printer 50 when registering image data in the printer 50, deleting image data from the printer 50, or previewing the image data in a printer 50, and uses this serial number to store image data linked to a key code in the registered image data information file 66. With the arrangement and method of the first embodiment, however, problems can arise when not using the graphics register 70 or receipt designer 80 that understand this relationship between key codes and image data. For example, if a different computer overwrites the image data in the printer 50, or the image registration device 10 uses an image registration device other than the graphics register 70 or receipt designer 80 to write image data in the printer 50, the correlation between the key codes and image data known to the graphics register 70 and receipt designer 80 from the registered image data information file 66 may be broken, and the image registration device may associate the wrong image data with a particular key code.

This further embodiment of the invention therefore relates to a printer, an image registration device, and a printer system arranged to prevent such a mistaken image data correlation by the graphics register 70 and receipt designer 80 when another computer or image registration device is also used. Note that functions that are basically the same as described in the first embodiment are identified by like reference numeral, and further description thereof is omitted below.

Figure 20:
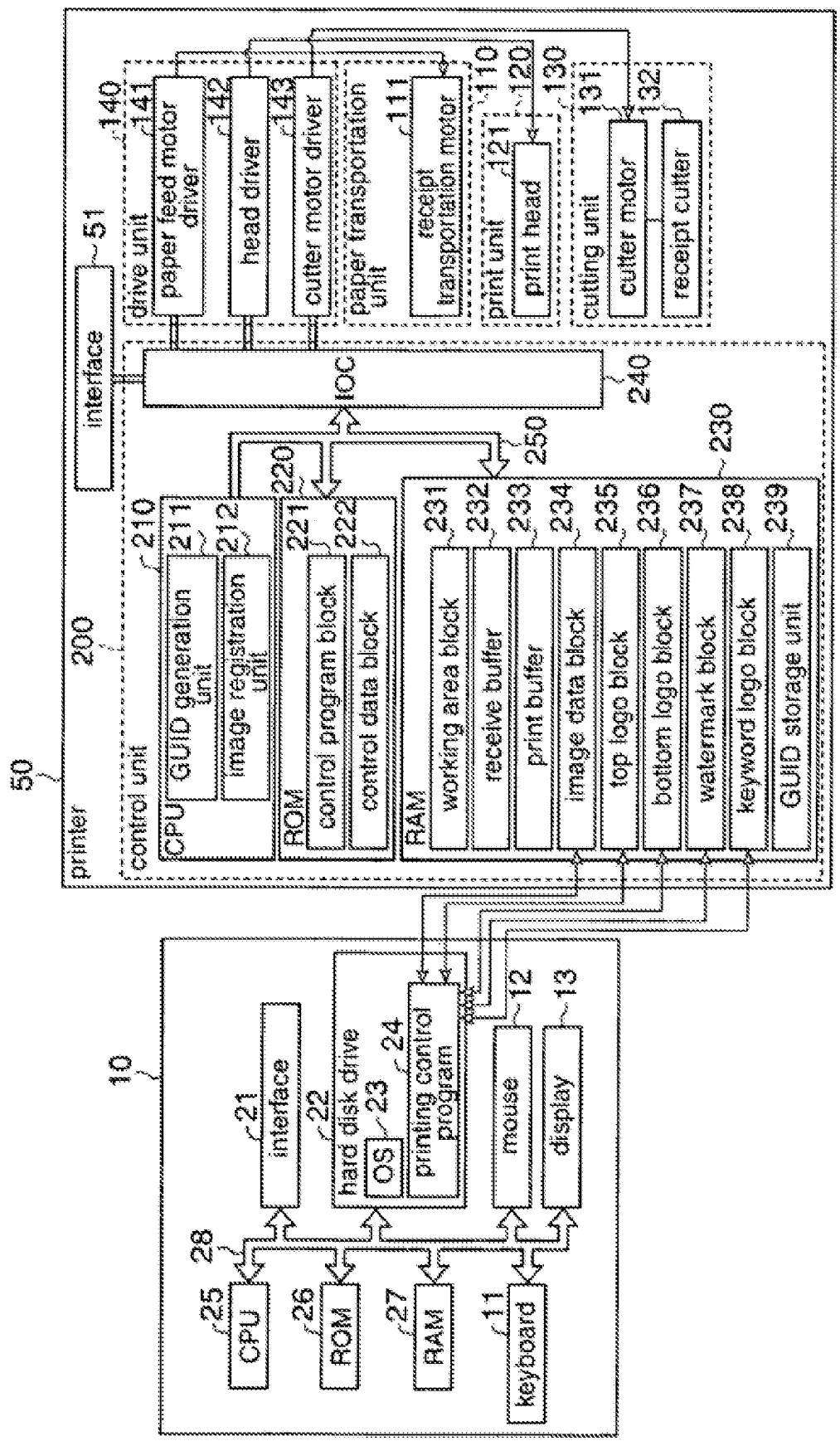
FIG. 20 is a control block diagram of a printer and image registration device according to a second embodiment of the invention.

FIG. 20 is a control block diagram of an image registration device and printer according to this second embodiment of the invention.

In addition to the elements of the earlier embodiments described above, this further embodiment of the invention additionally comprises a GUID generation unit 211 (identification number overwriting unit), and a GUID storage unit 239 in RAM 230 for storing the generated GUID, as shown in FIG. 20.

The GUID that is a major component of this embodiment of the invention is described below.

The printer 50 in this embodiment of the invention is arranged to generate a unique identification number referred to as a GUID for use when registering image data, deleting image data, and previewing image data based on commands from a plurality of image registration devices. The GUID generation unit 211 shown in FIG. 20 generates this GUID when the image registration device 10 starts or ends an image data registration process (including deletion processes). The GUID is generated from the printer 50 serial number and a sequence number as described below, for example. The sequence number preferably has sufficiently more digits than will be needed to accommodate the most number of image data registration and deletion operations that may actually be executed.

For example, if the printer 50 serial number is ABCDEFG, each new GUID is generated by incrementing the sequence number as shown below.

GUID (initial value): ABCDEFG0000000000000000
(first iteration): ABCDEFG0000000000000001
(second iteration): ABCDEFG0000000000000002

After the guide reaches ABCDEFGFFFFFFFFFFFFFFFF, the next GUID reverts to ABCDEFG0000000000000000. While this GUID of ABCDEFG0000000000000000 duplicates a previously used GUID, the first GUID of the same value will be quite old if the number of digits in the sequence number is sufficiently large, and will thus pose no practical problem.

This embodiment of the invention thus generates a new GUID based on the printer 50 serial number each time an image data registration process runs. Because the GUID is based on the printer 50 serial number, the GUID is both unique to each printer and variable. Furthermore, because the GUID is generated each time an image data registration process runs, any particular printer 50 can be uniquely identified from every other printer.

A match between the GUID stored in the printer 50 and the GUID stored by a particular image registration device 10 means that a different image registration device has not modified the image data stored in the printer 50 since the last time the particular image registration device 10 registered (or deleted) image data in the printer 50. Likewise, a mismatch between the GUID stored in the printer 50 and the GUID stored by a particular image registration device 10 means that a different image registration device modified the image data stored in the printer after the particular image registration device 10 last registered (or deleted) image data in the printer 50.

If multiple image registration devices can register image data in a printer, whether the image data information registered in a particular printer 50 matches the image data information known to a particular image registration device 10 can be determined by determining if the GUIDs are the same. This prevents deleting image data from the printer that should not be deleted or previewing the wrong image data as a result of a mismatch between the image data information stored in the printer and the image data that is understood by the image registration device 10 to be stored in the printer 50.

To enable this operation, the graphics register 70 first acquires the GUID from the printer 50 before registering image data in the printer 50. After completing the image registration process, the printer 50 generates a new GUID and the graphics register 70 acquires the new GUID from the printer 50. The graphics register 70 then finds the registered image data information file identified by the old GUID, and records the location of the source image file from which the image data registered in the printer 50 was generated (that is, the logic path describing where the source image file is stored starting from the root directory), the key code, and the type and content (the number of colors, color reduction method, brightness, size, and bottom margin, for example) of the image conversion process applied to the image file in the registered image data information file (registration log file) 66. The new GUID is then assigned to this registered image data information file 66. As a result, the graphics register 70 maintains a correct correlation between the GUID of the printer 50 and the corresponding registered image data information file 66.

To preview image data, the receipt designer 80 sends a command to the printer 50 to acquire the key codes of the registered image data, the parameter settings for each image, and the current GUID from the printer 50, and then lists this information in the registered graphics list box 82. Based on the GUID of the printer 50, the receipt designer 80 locates and reads the corresponding registered image data information file 66 to list the file name corresponding to each image key code (ID) in the registered graphics list box 82. If the GUID received from the printer 50 does not match the GUID assigned in the registered image data information file 66, the receipt designer 80 knows that the image data in the printer 50 has been changed by some other device or means.

Interaction between the graphics register 70 and receipt designer 80 and the printer 50 using the GUID is described next.

As described above, the graphics register 70 and receipt designer 80 do not acquire the image data from the printer 50. The graphics register 70 generates a registered image data information file 66 when the image data is registered, and thereafter the graphics register 70 and receipt designer 80 get only the GUID of the printer 50 and the key codes of the registered image data from the printer 50. The registered image data information file is then read to print and preview the images corresponding to each key code.

Image data registration, deletion, and preview operations in this embodiment of the invention are described next below with reference to the accompanying flow charts.

The process of registering image data in the printer 50 is described first.

Figure 21:
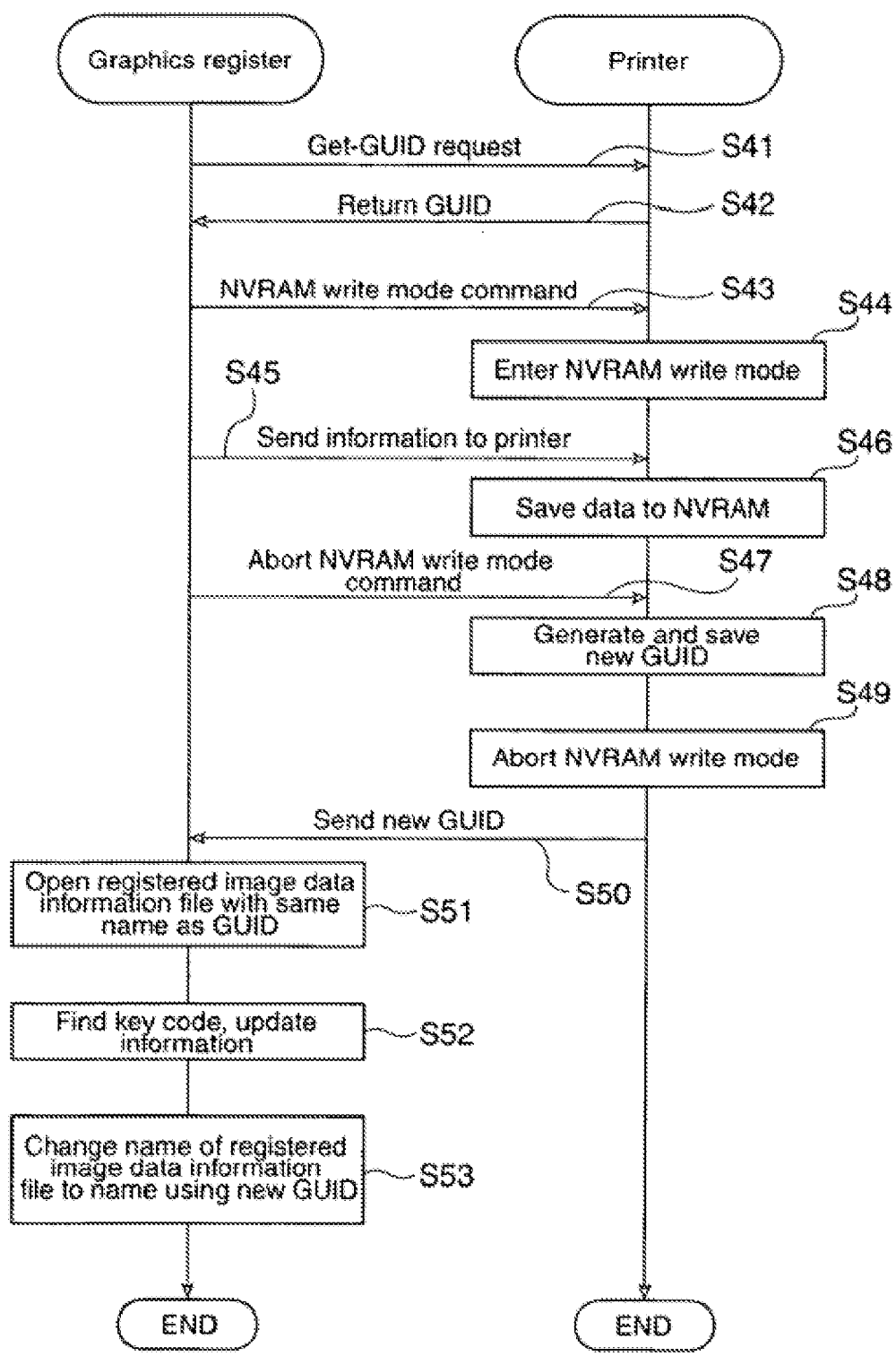
FIG. 21 is a flow chart of a process for registering image data in a printer according to a second embodiment of the invention.

FIG. 21 is a flow chart of the process for registering image data in the printer 50. The process whereby the graphics register 70 of the image registration device 10 registers image data in the printer 50 is described below.

The graphics register 70 first asks the printer 50 to return the printer GUID (step S41).

When the printer 50 receives the GUID request, the printer 50 reads the GUID stored in the nonvolatile GUID storage unit 239 part (also referred to as NVRAM herein) of RAM 230, and sends the GUID to the image registration device 10, or more specifically the graphics register 70 (step S42).

After receiving the GUID from the printer 50, the graphics register 70 instructs the printer 50 to enter the NVRAM write mode (step S43). The printer 50 enters the NVRAM write mode when this command is received, and thus enables writing to the nonvolatile areas of RAM 230, that is, the image data block 234, top logo block 235, bottom logo block 236, watermark block 237, and keyword logo block 238 (step S44).

The graphics register 70 then processes the source image file based on the number of colors, color reduction method, brightness, size, and bottom margin settings defined for the image data to generate the image data to be registered in the printer, and sends the registration information, specifically the resulting image data and key code, to the printer 50 (step S45).

When the printer 50 receives the image data, it saves the image data with the key code to the image data block 234, and thus registers the image data (step S46).

When the graphics register 70 finishes sending the registration information, the graphics register 70 instructs the printer 50 to exit the NVRAM write mode (step S47). When the printer 50 receives this command, the GUID generation unit 211 generates a new GUID and saves the new GUID by overwriting the content of the GUID storage unit 239 (step S48). The NVRAM write mode thus ends, and the printer 50 returns to the normal standby mode (step S49).

When the printer 50 terminates the NVRAM write mode, the printer 50 sends the new GUID to the graphics register 70 (step S50). When the graphics register 70 receives the new GUID from the printer 50, the graphics register 70 opens the registered image data information file 66 with the file name corresponding to the GUID received in step S42 (step S51). The graphics register 70 then finds the key codes in the registered image data information file 66, and overwrites the information in the registered image data information file 66 corresponding to the key code and image data sent to the printer 50 (step S52). This results in the image data and key codes registered in the printer 50 matching the image data and key codes stored in the registered image data information file 66.

The graphics register 70 then changes the name of the registered image data information file 66 based on the name of the new GUID received from the printer 50 (step S53). The file name of the registered image data information file 66 is the same as the new GUID or is linked to the new GUID. This completes registering image data in the printer 50.

When the graphics register 70 registers image data in the printer 50, the printer 50 thus overwrites the stored GUID with a new GUID in this embodiment of the invention. The graphics register 70 also changes the name of the registered image data information file 66 file based on this new GUID, and can thus reliably know if the information in the printer 50 has been changed or not.

If the image registration device 10 then communicates with the printer 50 and the graphics register 70 determines that the GUID received from the printer 50 matches the GUID assigned to the registered image data information file 66, the graphics register 70 knows that the information in the printer 50 has not been changed by another image registration device since the last time the image registration device 10 connected to the printer 50. On the other hand, if the GUID received from the printer 50 does not match the GUID assigned to the registered image data information file 66, the graphics register 70 knows that the information in the printer 50 has been changed by another image registration device.

This embodiment of the invention thus prevents the graphics register 70 from changing the image data stored in the printer 50 erroneously as a result of a change in the correlation between the image data and key codes known to the graphics register 70, and thus prevents creating a mismatch between the key codes and registered image data.

If the relationship between the key codes and image data that is known to the image registration device becomes broken, the graphics register 70 can acquire the key codes and image data information from the printer 50 and simply reconstruct the registered image data information file 66. This links the new GUID acquired from the printer 50 with the registered image data information file 66, and thus maintains the correct correlation between key codes and image data for subsequent processes.

Deleting image data from the printer 50 is described next.

Figure 22:
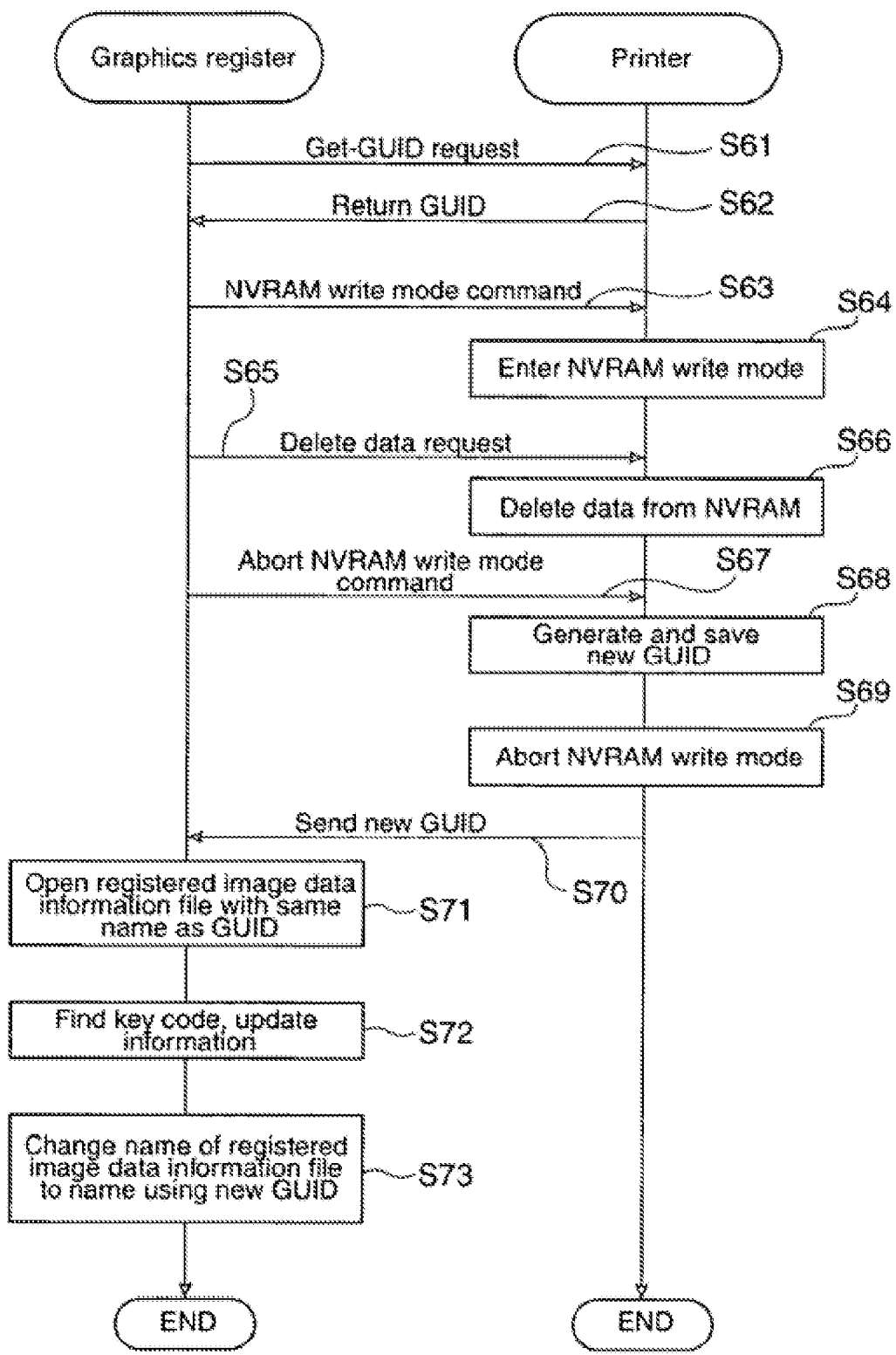
FIG. 22 is a flow chart of a process for deleting image data in a printer according to a second embodiment of the invention.

FIG. 22 is a flow chart of the process for deleting image data from the printer 50.

The graphics register 70 first asks the printer 50 to return the printer GUID (step S61).

When the printer 50 receives the GUID request, the printer 50 reads the GUID stored in the nonvolatile GUID storage unit 239 part of RAM 230, and sends the GUID to the graphics register 70 (image registration device 10) (step S62).

After receiving the GUID from the printer 50, the graphics register 70 instructs the printer 50 to enter the NVRAM write mode (step S63). The printer 50 enters the NVRAM write mode when this command is received, and thus enables writing to the nonvolatile areas of RAM 230, that is, the image data block 234, top logo block 235, bottom logo block 236, watermark block 237, and keyword logo block 238 (step S64).

The graphics register 70 then sends the key code of the image data to be deleted to the printer 50 (step S65). The printer 50 then deletes the image data corresponding to the key code when the key code is received (step S66).

When the graphics register 70 finishes sending the key codes of image data to be deleted, the graphics register 70 instructs the printer 50 to exit the NVRAM write mode (step S67). When the printer 50 receives this command, the GUID generation unit 211 generates a new GUID and saves the new GUID by overwriting the content of the GUID storage unit 239 (step S68). The NVRAM write mode thus ends, and the printer 50 returns to the normal standby mode (step S69).

When the printer 50 terminates the NVRAM write mode, the printer 50 sends the new GUID to the graphics register 70 (step S70).

When the graphics register 70 receives the new GUID from the printer 50, the graphics register 70 opens the registered image data information file 66 with the file name corresponding to the GUID received in step S62 (step S71). The graphics register 70 then finds the key codes in the registered image data information file 66, and deletes the key code and information corresponding to the deleted image data from the registered image data information file 66 (step S72). This results in the image data and key codes registered in the printer 50 matching the image data and key codes stored in the registered image data information file 66.

The graphics register 70 then changes the name of the registered image data information file 66 based on the name of the new GUID received from the printer 50 (step S73). The file name of the registered image data information file 66 is the same as the new GUID or is linked to the new GUID. This completes deleting image data from the printer 50.

When the graphics register 70 deletes image data in the printer 50, the printer 50 thus overwrites the stored GUID with a new GUID in this embodiment of the invention. The graphics register 70 also changes the name of the registered image data information file 66 file based on this new GUID, and can thus reliably know if the information in the printer 50 has been changed or not.

The printer 50 in this embodiment of the invention thus changes the GUID when image data is deleted. Furthermore, by changing the file name of the registered image data information file 66 based on the new GUID, the graphics register 70 can reliably know whether information in the printer 50 has been changed or not.

Similarly to the situation after image data is registered in the printer, if the image registration device 10 then communicates with the printer 50 and the graphics register 70 determines that the GUID received from the printer 50 matches the GUID assigned to the registered image data information file 66, the graphics register 70 knows that the information in the printer 50 has not been changed by another image registration device since the last time the image registration device 10 connected to the printer 50. On the other hand, if the GUID received from the printer 50 does not match the GUID assigned to the registered image data information file 66, the graphics register 70 knows that the information in the printer 50 has been changed by another image registration device.

This embodiment of the invention thus prevents the graphics register 70 from changing the image data stored in the printer 50 erroneously as a result of a change in the correlation between the image data and key codes known to the graphics register 70, and thus prevents creating a mismatch between the key codes and registered image data.

If the relationship between the key codes and image data that is known to the image registration device becomes broken, the graphics register 70 can acquire the key codes and image data information from the printer 50 and simply reconstruct the registered image data information file 66. This links the new GUID acquired from the printer 50 with the registered image data information file 66, and thus maintains the correct correlation between key codes and image data for subsequent processes.

A process for acquiring information, particularly key codes, related to the image data registered in the printer 50 from the printer 50 and viewing the corresponding image data is described next.

Figure 23:
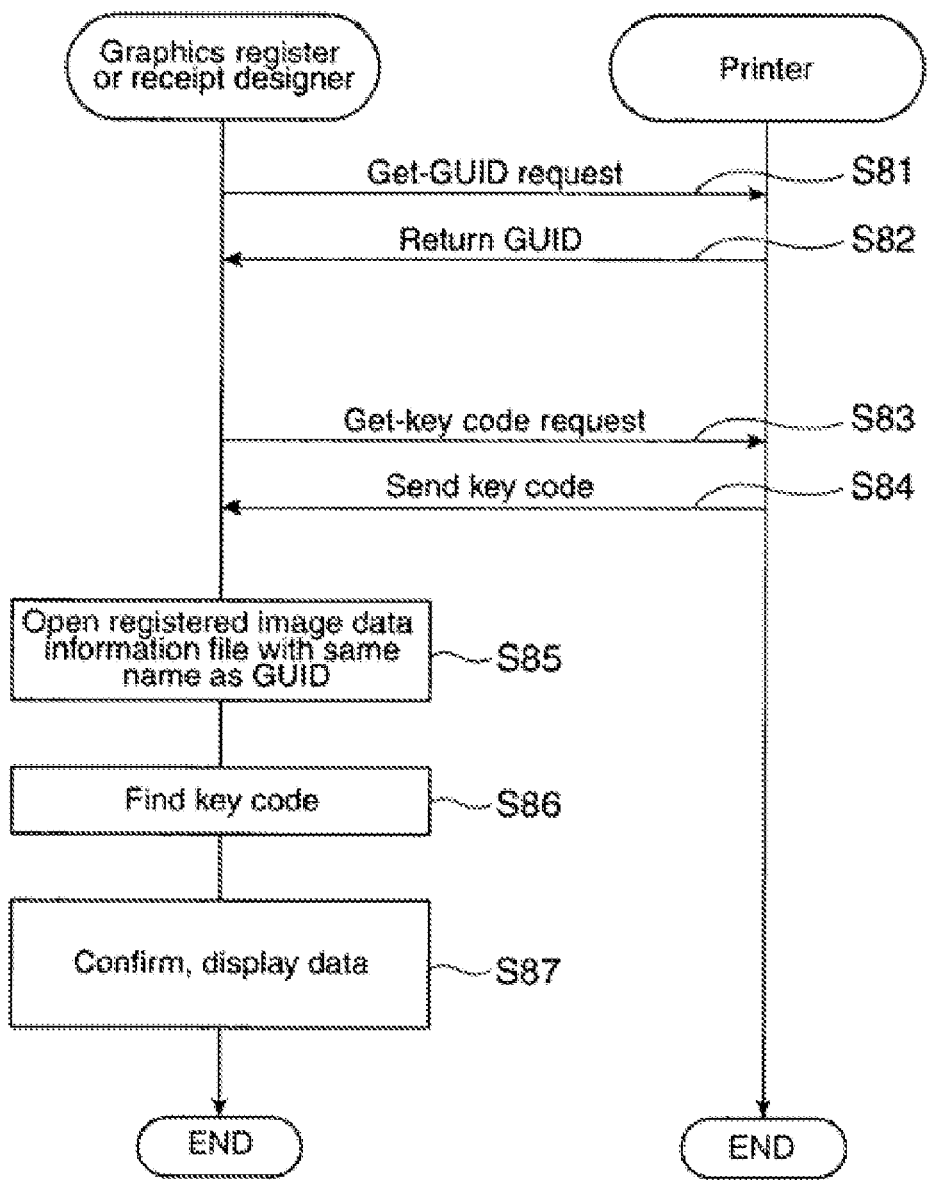
FIG. 23 is a flow chart of a process for acquiring image data key codes from the printer and displaying a preview of the image data in a second embodiment of the invention.

FIG. 23 is a flow chart of a process for acquiring key codes from the printer 50 and then previewing the image data. The graphics register 70 acquires the key codes from the printer 50 in the example described below. Note that the information can also be acquired and previewed by the receipt designer 80 running the same process described below.

The graphics register 70 first asks the printer 50 to return the printer GUID (step S81).

When the printer 50 receives the GUID request, the printer 50 reads the GUID stored in the nonvolatile GUID storage unit 239 part of RAM 230, and sends the GUID to the graphics register 70 (image registration device 10) (step S82).

After receiving the GUID from the printer 50, the graphics register 70 asks the printer 50 to send the key codes (step S83). When the printer 50 receives the key code request, the printer 50 reads the key codes from RAM 230 and sends the key codes to the graphics register 70 (step S84).

When the graphics register 70 receives the key codes from the printer 50, the graphics register 70 opens the registered image data information file 66 with the file name corresponding to the GUID received in step S82 (step S85). The graphics register 70 then searches the key codes in the registered image data information file 66, and finds the record matching the received key code (step S86). Based on instructions from the user, the graphics register 70 then references the file path recorded in the registered image data information file 66 for the image data corresponding to the key code, and displays the image data (step S87).

The graphics register 70 thus receives the GUID before receiving key codes from the printer 50 in this embodiment of the invention, and references the registered image data information file 66 corresponding to the GUID to display image data. The image data is thus displayed after first confirming that the image data information in the printer 50 has not been changed by another image registration device.

This embodiment of the invention thus prevents the graphics register 70 from changing the image data stored in the printer 50 erroneously as a result of a change in the correlation between the image data and key codes known to the graphics register 70, and thus prevents creating a mismatch between the key codes and registered image data.

If the relationship between the key codes and image data that is known to the image registration device becomes broken, the graphics register 70 can acquire the key codes and image data information from the printer 50 and simply reconstruct the registered image data information file 66. This links the new GUID acquired from the printer 50 with the registered image data information file 66, and thus maintains the correct correlation between key codes and image data for subsequent processes.

The GUID is generated by adding a sequence number to the printer serial number in this embodiment of the invention, but if the printer only returns the serial number, the GUID is only the sequence number. In this case, the image registration device combines the printer serial number with the GUID. Yet further, because it is only necessary that one GUID is not the same as another GUID, some other ID that uniquely identifies each printer can be used instead of the printer serial number. A time code can also be used instead of the sequence number.

The GUID is tied to an individual printer and each printer generates a unique GUID in this embodiment of the invention, but the GUID can be defined for each unit of image data. In this case the GUID is generated from the printer serial number, the sequence number, and information related to the image key code (such as the image file name or the key code itself).

The image data could also be divided into categories, and the printer could generate a GUID for each category. In this case the write mode is set and cancelled when working with a particular category.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image registration method comprising steps of:
    generating a key code identifying a source image file containing image data;
    recording in a registration log file a path to a storage location of the source image file of the image data linked to the key code;
    sending to a printer the image data to be registered;
    receiving from the printer a printer identification number that identifies the printer;
    recording the received printer identification number in the registration log file; and
    reading the registration log file to present a preview of image data registered to the printer without receiving a key code from the printer.

2. The image registration method according to claim 1, further comprising steps of:
    generating the image data to be registered by applying an image conversion process to the source image file; and
    additionally recording the path describing the storage location of the source image file linked to the parameters of the applied image conversion process in the registration log file.

3. The image registration method according to claim 2, further comprising steps of:
    sending a delete command denoting image data to be deleted to the printer;
    receiving a printer identification number from the printer; and
    locating a registration log file based on the printer identification number and deleting the image data associated with said registration log file.

4. The image registration method according to claim 3, wherein the printer identification number is received from the printer to identify the registration log file to be referenced when presenting a preview.

* * * * *